United States Patent
Tagami et al.

(10) Patent No.: US 8,994,335 B2
(45) Date of Patent: Mar. 31, 2015

(54) POWER SUPPLY APPARATUS, CHARGING METHOD, RECHARGEABLE BATTERY CELL UNIT, AND CHARGING APPARATUS

(75) Inventors: Hiroyasu Tagami, Fukuoka (JP); Kouzi Tsukamoto, Fukuoka (JP)

(73) Assignee: Sony Corporation, Tokyo (JP)

( * ) Notice: Subject to any disclaimer, the term of this patent is extended or adjusted under 35 U.S.C. 154(b) by 425 days.

(21) Appl. No.: 13/460,140

(22) Filed: Apr. 30, 2012

(65) Prior Publication Data

US 2012/0306449 A1    Dec. 6, 2012

(30) Foreign Application Priority Data

Jun. 3, 2011    (JP) .................................. 2011-125801

(51) Int. Cl.
*H02J 7/00*    (2006.01)

(52) U.S. Cl.
CPC ....... *H02J 7/0024* (2013.01); *H02J 2007/0095* (2013.01)
USPC ........... 320/134; 320/118; 320/119; 320/121; 320/128; 320/136

(58) Field of Classification Search
CPC .... H01M 10/482; H02J 7/0013; H02J 7/0024
USPC .......... 320/120, 121, 118–119, 128, 134, 136
See application file for complete search history.

(56) References Cited

U.S. PATENT DOCUMENTS

| | | | |
|---|---|---|---|
| 2009/0096419 A1 * | 4/2009 | White et al. | 320/118 |
| 2010/0188047 A1 * | 7/2010 | Liu et al. | 320/118 |
| 2011/0298425 A1 * | 12/2011 | Liu et al. | 320/118 |
| 2011/0309796 A1 * | 12/2011 | Firehammer | 320/118 |
| 2012/0038322 A1 * | 2/2012 | Moorhead et al. | 320/136 |
| 2012/0074906 A1 * | 3/2012 | Kang et al. | 320/118 |
| 2012/0256568 A1 * | 10/2012 | Lee | 318/139 |
| 2013/0099747 A1 * | 4/2013 | Baba et al. | 320/118 |
| 2013/0241480 A1 * | 9/2013 | Kirimoto et al. | 320/109 |

FOREIGN PATENT DOCUMENTS

| | | |
|---|---|---|
| JP | 11-215731 | 8/1999 |
| JP | 2010-124597 | 6/2010 |

* cited by examiner

*Primary Examiner* — Naum B Levin
(74) *Attorney, Agent, or Firm* — Sony Corporation

(57) ABSTRACT

A power supply apparatus supplies a power supply voltage to a charge monitor that monitors charge states of rechargeable battery cells. The apparatus includes: a first capacitative element that supplies a power supply voltage to the charge monitor; a second capacitative element that is charged from the rechargeable battery cell and charges the first capacitative element; a switch group including a first switch that connects the first and second capacitative elements, and a second switch that connects the rechargeable battery cell and the second capacitative element; and a controller that controls the switch group. The controller repeats charging the second capacitative element by the rechargeable battery cell by connecting the rechargeable cell and the second capacitative element by the first switch, and charging the first capacitative element by the second capacitative element by connecting the first and second capacitative elements by the second switch.

12 Claims, 21 Drawing Sheets

POWER SUPPLY APPARATUS, CHARGING METHOD, RECHARGEABLE BATTERY CELL UNIT, AND CHARGING APPARATUS

BACKGROUND

The present disclosure relates to a power supply apparatus, a charging method, a rechargeable battery cell unit, and a charging apparatus.

Charging apparatuses such as lithium-ion battery packs that can be repeatedly charged and discharged have been known. Some of these charging apparatuses have a configuration in which rechargeable battery cell units, each of which is formed of a plurality of rechargeable battery cells connected in series, are connected in series. When the charging apparatus is charged and discharged, each of the rechargeable battery cells is also charged and discharged, and thus a charge state of each cell changes. When the charging and discharging are repeated, each of the rechargeable battery cells begins to exhibit a different charge state. If the charging and discharging are continuously repeated in a charge state that varies from one cell to another, the life of the rechargeable battery cells will be shortened. Japanese Patent Document No. 3829453 discloses a method of prolonging the life of rechargeable battery cells by monitoring a charge state of each rechargeable battery cell and controlling, in accordance with the charge state, the charging and discharging of a charging apparatus.

In order to achieve downsizing and cost reduction of a monitoring circuit that monitors a charge state of each rechargeable battery cell, there has been a need to manufacture a monitoring circuit as a large scale integrated (LSI) circuit. To manufacture an LSI monitoring circuit, it is necessary to configure a circuit with, for example, a low-voltage metal-oxide semiconductor (MOS) transistor. If the monitoring circuit is configured as a low-voltage circuit, a voltage to be supplied to the monitoring circuit has to be a low voltage. In order to comply with this, Japanese Patent Application Laid-open No. 2010-124597 discloses a configuration in which the voltage of a rechargeable battery cell unit is reduced in order to supply a stepped-down power supply voltage to a low-voltage driven monitoring circuit.

SUMMARY

As disclosed in Japanese Patent Application Laid-open No. 2010-124597, in a case where a stepped-down power supply voltage is supplied to a monitoring circuit after stepping down the voltage of a rechargeable battery cell unit, a step-down circuit such as a DC-DC converter or a series regulator has to be provided.

In a case where the voltage of a rechargeable battery cell unit is stepped down by means of a DC-DC converter, it is necessary to make use of an external coil or a large-capacity capacitor. This results in, for example, an increase in the number of components or mounting area for them, thereby making the realization of the LSI monitoring circuit difficult.

In a case where a series regulator is used, the LSI monitoring circuit is manufactured easier in comparison with a case where a DC-DC converter is used, but a problem arises in which a difference between an output voltage (a power supply voltage) and a voltage of a rechargeable battery cell unit, which is a supply source, becomes a power loss as it is. This leads to an increase in power consumption. For example, when using a rechargeable battery cell unit, in which 16 pieces of 3 V rechargeable battery cells are connected in series, the rechargeable battery cell unit being the supply source has a total output voltage of 48 V. In this case, when the monitoring circuit consumes 5 mA at a power supply of 3 V after stepping down the voltage of a rechargeable battery cell unit, then (48 V−3 V)×5 mA=225 mW is consumed at a step-down circuit. In this way, the use of a series regulator causes higher power consumption and hampers energy efficiency. When this consumed electric power is converted into heat, heat related problems also arise.

In view of the circumstances as described above, there is a need for a power supply apparatus and a charging method that are capable of supplying a monitoring circuit with a power supply voltage with low power consumption.

There is also a need for a rechargeable battery cell unit and a charging apparatus that include such a power supply apparatus.

According to an embodiment of the present disclosure, there is provided a power supply apparatus, configured to supply a power supply voltage to a charge monitor configured to monitor a charge state of each of a plurality of rechargeable battery cells, the apparatus including:

a first capacitative element configured to supply a power supply voltage to the charge monitor;

a second capacitative element configured to be charged from at least one of the rechargeable battery cells and charge the first capacitative element;

a switch group including
a first switch configured to connect the first capacitative element and the second capacitative element to each other, and
a second switch configured to connect the at least one of the rechargeable battery cells and the second capacitative element to each other; and a controller configured to control the switch group, the controller being further configured to repeat
first control of charging the second capacitative element by the at least one of the rechargeable battery cells by connecting the at least one of the rechargeable cells and the second capacitative element to each other by the first switch, and
second control of charging the first capacitative element by the second capacitative element by connecting the second capacitative element and the first capacitative element to each other by the second switch.

By charging the first capacitative element from the rechargeable battery cell via the second capacitative element using the second capacitative element as a charge pump, the first capacitative element can be charged with low power consumption. With this configuration, a power supply voltage can be supplied to a monitoring circuit with low power consumption.

According to another embodiment of the present disclosure, there is provided a charging method of charging a first capacitative element of a power supply apparatus configured to supply to a charge monitor configured to monitor a charge state of each of a plurality of rechargeable battery cells a power supply voltage charged to the first capacitative element, the method including: charging a second capacitative element from at least one of the rechargeable battery cells by connecting the at least one of the rechargeable battery cells and the second capacitative element to each other to each other; and charging the first capacitative element from the second capacitative element by connecting the second capacitative element and the first capacitative element to each other, the first capacitative element being charged by repeating the charging of the second capacitative element and the charging of the first capacitative element.

According to another embodiment of the present disclosure, there is provided a rechargeable battery cell unit including a plurality of rechargeable battery cells, a charge monitor configured to monitor a charge state of each of the plurality of rechargeable battery cells, and the above-mentioned power supply apparatus configured to supply a power supply voltage to the charge monitor.

According to another embodiment of the present disclosure, there is provided a charging apparatus including a plurality of rechargeable battery cell units described above.

According to the present disclosure, a power supply voltage can be supplied to a monitoring circuit with low power consumption.

These and other objects, features and advantages of the present disclosure will become more apparent in light of the following detailed description of best mode embodiments thereof, as illustrated in the accompanying drawings.

DETAILED DESCRIPTION OF EMBODIMENTS

First Embodiment

Figure 1:
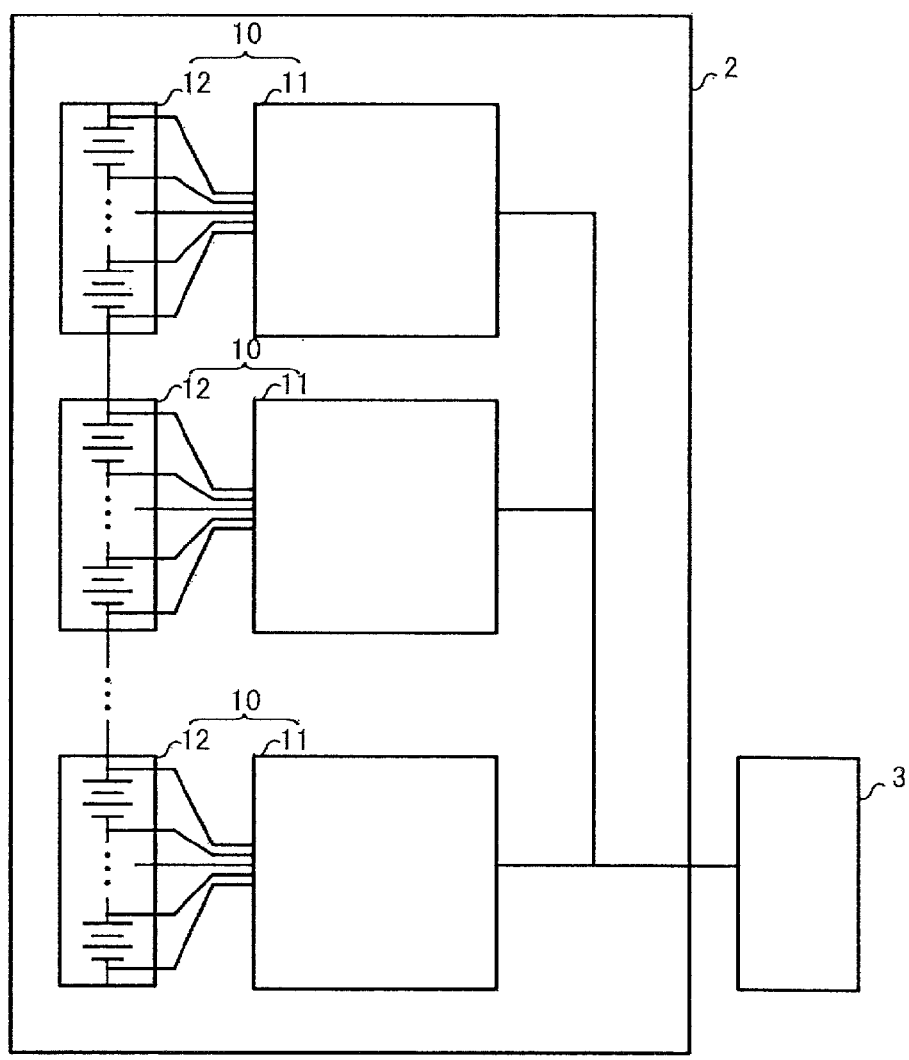
FIG. 1 shows a charging apparatus according to a first embodiment of the present disclosure.

FIG. 1 shows a charging apparatus 1 according to a first embodiment of the present disclosure. The charging apparatus 1 has a plurality of rechargeable battery modules 10 and a charge monitoring controller 3. Each of the plurality of rechargeable battery modules 10 has a charge monitoring module 11 and a rechargeable battery cell unit 12. The plurality of rechargeable battery modules 10 are also collectively referred to as a charging unit 2.

The plurality of rechargeable battery modules 10 are connected to the charge monitoring controller 3 by means of signal lines such as bus lines. The charge monitoring controller 3 instructs each charge monitoring module 11, for example, to start or end monitoring of each rechargeable battery cell unit 12, for example. On the basis of a notice of a charge state of each rechargeable battery cell unit 12 from the charge monitoring module 11, the charge monitoring controller 3 determines whether or not to charge the charging apparatus 1 or notifies an external apparatus (not shown in figures) of a charge state of the charging apparatus 1.

Figure 2:
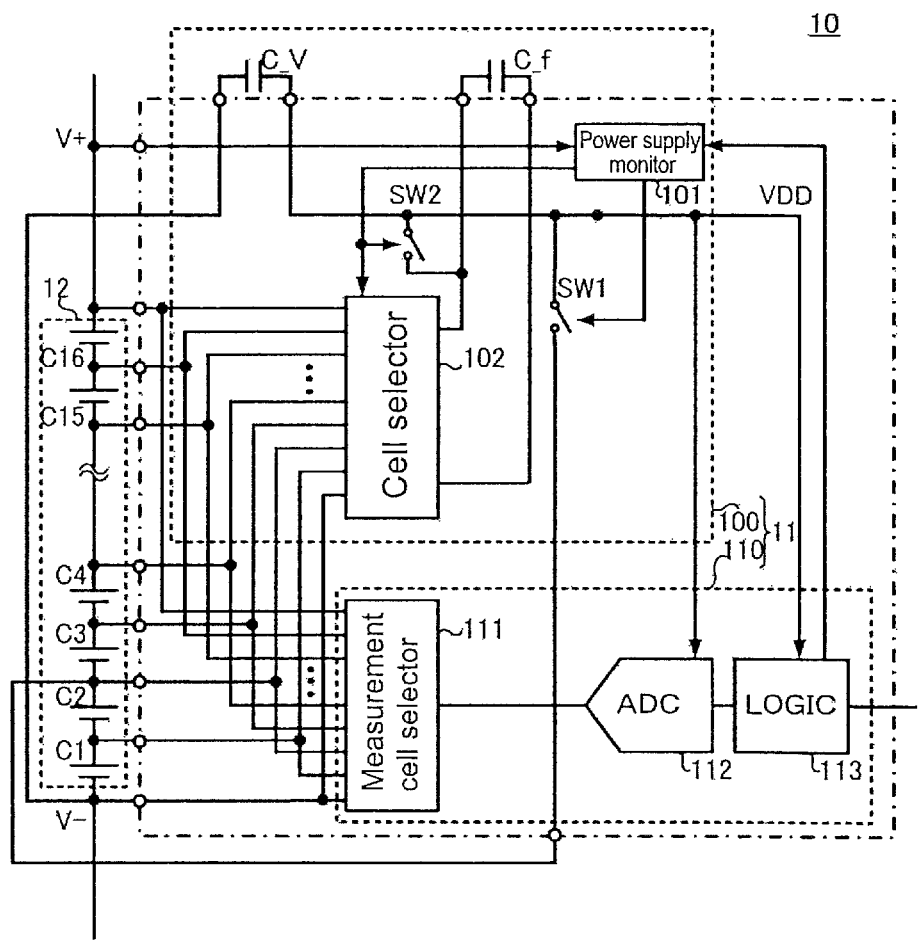
FIG. 2 shows a rechargeable battery module according to the first embodiment.

Next, details of the rechargeable battery modules 10 will be explained with reference to FIG. 2. The rechargeable battery cell unit 12 of each of the rechargeable battery modules 10 has a plurality of rechargeable battery cells C1, C2, ..., C16. The rechargeable battery cells C1, C2, ..., C16 are secondary battery cells such as a lithium ion battery cell that can be charged and discharged repeatedly.

The rechargeable battery cells C1, C2, ..., C16 are connected in series from a side of a negative terminal V− of the rechargeable battery cell unit 12 in the stated order. Each of these rechargeable battery cells has a center electric potential of 3.2 V, a lower limit electric potential of 2.5 V, and an upper limit electric potential of 4 V. These electric potentials of the rechargeable battery cells and the number of connected rechargeable battery cells (16 cells in this embodiment) are given as examples. Other voltage range and the number of connected rechargeable battery cells may be adopted.

The charge monitoring module 11 has a charge monitor 110 and a power supply apparatus 100 that supplies a power supply voltage to the charge monitor 110.

The charge monitor 110 has a measurement cell selector 111 that selects a rechargeable battery cell to measure a charge state thereof, an analog-to-digital converter (ADC) 112 that converts the voltage of a rechargeable battery cell selected by the measurement cell selector 111 into a digital voltage signal, and a logic circuit 113 that performs signal processing on the voltage signal output by the ADC 112 and outputs the measured charge state to the charge monitoring controller 3.

The measurement cell selector 111 has a plurality of switches (not shown in figures). For example, this selector selects a rechargeable battery cell to be measured by turning these switches on and off in accordance with an instruction from the logic circuit 113. The ADC 112 and the logic circuit 113 are low-voltage circuits formed of, for example, metal oxide semiconductor (MOS) transistors. Both the ADC 112 and the logic circuit 113 operate based on a power supply voltage supplied by the power supply apparatus 100. Components of the charge monitor 110, such as the ADC 112 and the logic circuit 113 that operate at a low voltage, are collectively referred to as a "low-voltage circuit." In this embodiment, the explanation is given on the assumption that a maximum working voltage is 3.6 V and a minimum working voltage of the low-voltage circuit is 2.7 V.

The power supply apparatus 100 has a power supply monitor 101, a cell selector 102, a first switch SW1 and a second switch SW2, and a first capacitor C_V and a second capacitor C_f.

Both the power supply apparatus 100, excluding the first capacitor C_V and the second capacitor C_f, and the charge monitor 110 (an area surrounded by the dashed-dotted line in FIG. 2) can be formed of, for example, MOS transistors and easily realized in the form of an LSI.

Figure 3:
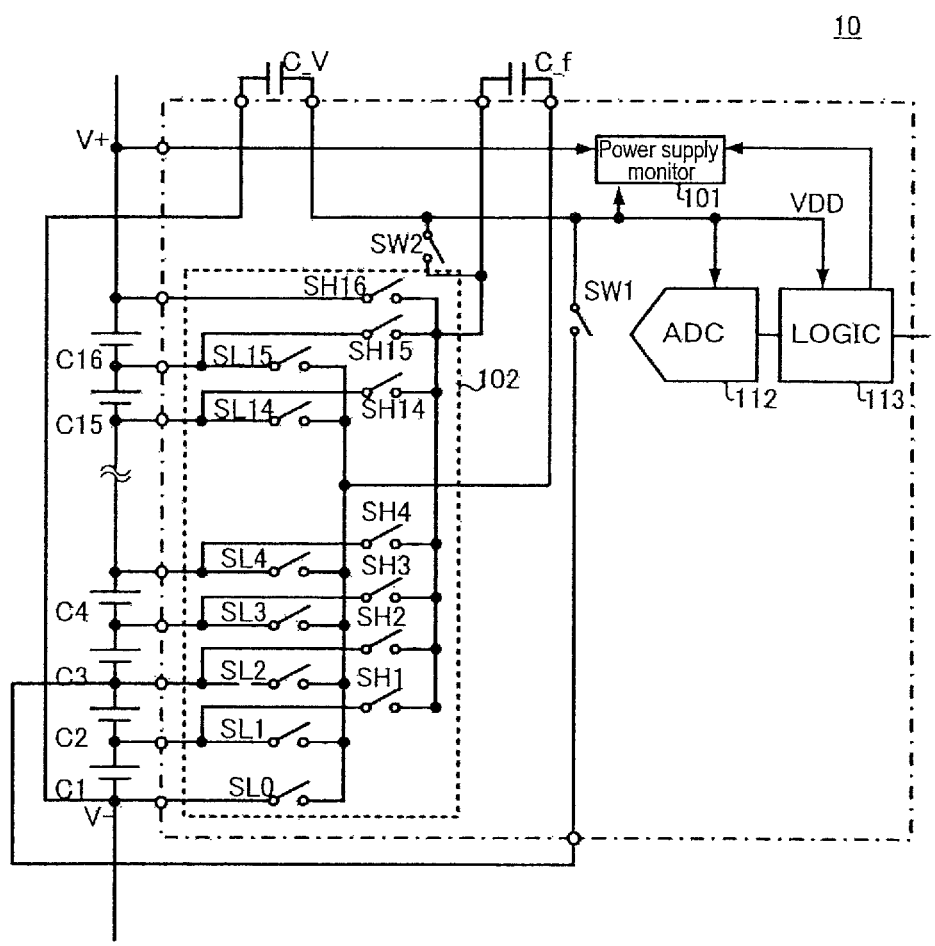
FIG. 3 shows the rechargeable battery module according to the first embodiment.

The power supply apparatus 100 will be explained in detail with reference to FIG. 3. This figure illustrates a rechargeable battery module 10. For the sake of simplification, the measurement cell selector 111 will be omitted in the figure.

The cell selector 102 is constituted of a plurality of switches. The cell selector 102 has low switches SL0 to SL15 for selection of negative terminals of respective rechargeable battery cells and high switches SH1 to SH16 for selection of positive terminals of respective rechargeable battery cells.

Ends on one side of the low switches SL0 to SL15 are connected to negative terminals of rechargeable battery cells in the stated order from the negative terminal V− and ends on the other side of the low switches SL0 to SL15 are connected to one end of the second capacitor C_f. For example, one end of the low switch SL0 is connected to a negative terminal of the rechargeable battery cell C1 and the other end of the low switch SL0 is connected to the one end of the second capacitor C_f. One end of the low switch SL1 is connected to a negative terminal of the rechargeable battery cell C2 and the other end of the low switch SL1 is connected to the one end of the second capacitor C_f. In this way, the low switches SL0 to SL15 are respectively connected to the negative terminals of the rechargeable battery cells C1 to C16 connected in series.

Ends on one side of the high switches SH1 to SH 16 are connected to positive terminals of rechargeable battery cells in the stated order from a side of the negative terminal V−, and ends on the other side of the high switches SH1 to SH 16 are connected to the other end of the second capacitor C_f. For example, one end of the high switch SH1 is connected to a positive terminal of the rechargeable battery cell C1 and the other end of the high switch SH1 is connected to the other end of the second capacitor C_f. One end of the high switch SH16 is connected to a positive terminal of the rechargeable battery cell C16 and the other end of the high switch SH16 is connected to the other end of the second capacitor C_f. In this way, the high switches SH1 to SH 16 are respectively connected to the positive terminals of the rechargeable battery cells C1 to C16 connected in series.

One end of the first capacitor C_V is connected to the negative terminal V− of the rechargeable battery cell unit 12 while the other end of the first capacitor C_V is connected to a positive terminal of the rechargeable battery cell C2 via the first switch SW1. The other end of the second capacitor C_f is connected to the other end of the first capacitor C_V via the second switch SW2. The other end of the first capacitor C_V is connected to the low-voltage circuit, and the first capacitor C_V supplies a power supply voltage VDD to the low-voltage circuit.

One end of the second capacitor C_f is connected ends on the other side of the low switches SL0 to SL15. The other end of the second capacitor C_f is connected to ends on the other side of high switches SH1 to SH 16 and the other end of the first capacitor C_V via the second switch SW2. The second capacitor C_f operates as a charge pump that charges the first capacitor C_V.

The power monitor 101 operates as a controller that controls the cell selector 102, the first switch SW1, and the second switch SW2 on the basis of a value of a power supply voltage VDD and a clock signal of the logic circuit 113. The cell selector 102, the first switch SW1, and the second switch SW2 are also collectively referred to as a switch group. The power monitor 101 controls the charging and discharging of the first capacitor C_V and the second capacitor C_f by controlling the switch group.

Next, the power supply apparatus 100 will be explained with reference to FIG. 4. This figure is a timing chart showing the operation of the switch group and charge states of the first capacitor C_V and the second capacitor C_f.

(Charging Operation During Activation)

For example, when the charging apparatus 1 is connected to an external power source such as an electrical outlet or an external apparatus such as a personal computer (PC), which are not shown in figures, and starts charging or discharging operation, and the charge monitor 110 starts monitoring a charge state of the rechargeable battery cell unit 12, then the power monitor 101 first controls the switch group so that the first capacitor C_V is charged to a predetermined voltage. Specifically, as shown in FIG. 4, the power monitor 101 controls the switch group so that the first switch SW1, the second switch SW2, and the low switch SL0 are turned on at the timing of time t1 while switches other than these switches are turned off.

Figure 5A:
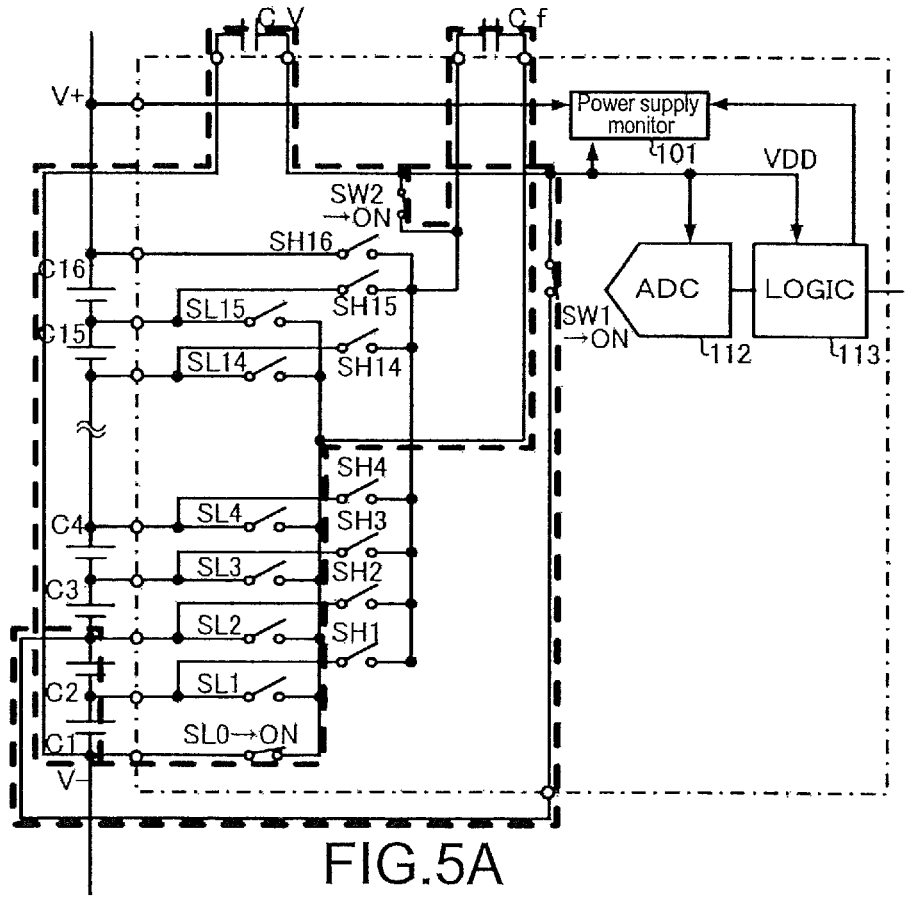
FIGS. 5A and 5B show the power supply apparatus at the time of charging operation during activation according to the first embodiment.
Figure 5B:
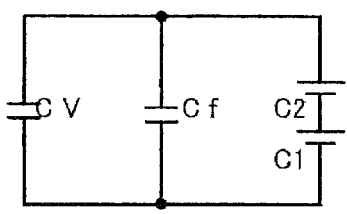

FIGS. 5A and 5B show a circuit diagram of the rechargeable battery module 10 at time t1. By turning on the first switch SW1, the second switch SW2, and the low switch SL0 while switches other than these switches are turned off, the first capacitor C_V and the second capacitor C_f, and the rechargeable battery cells C1 and C2 are connected in parallel as indicated by the dashed line in FIG. 5A. FIG. 5B shows an equivalent circuit showing a connected state of the rechargeable battery module 10 in FIG. 5A. The first capacitor C_V and the second capacitor C_f are charged from the rechargeable battery cells C1 and C2.

In this way, when the charge monitor 110 starts monitoring a charge state of the rechargeable battery cell unit 12, the power monitor 101 first charges the first capacitor C_V and the second capacitor C_f from a power circuit being a power supply having a voltage equal to or higher than a predetermined value. This is because when the charge monitor 110 is not monitoring a charge state, the first capacitor C_V and the second capacitor C_f are neither charged nor discharged, and hence the voltages of the first capacitor C_V and the second capacitor C_f may be lowered.

Figure 4:
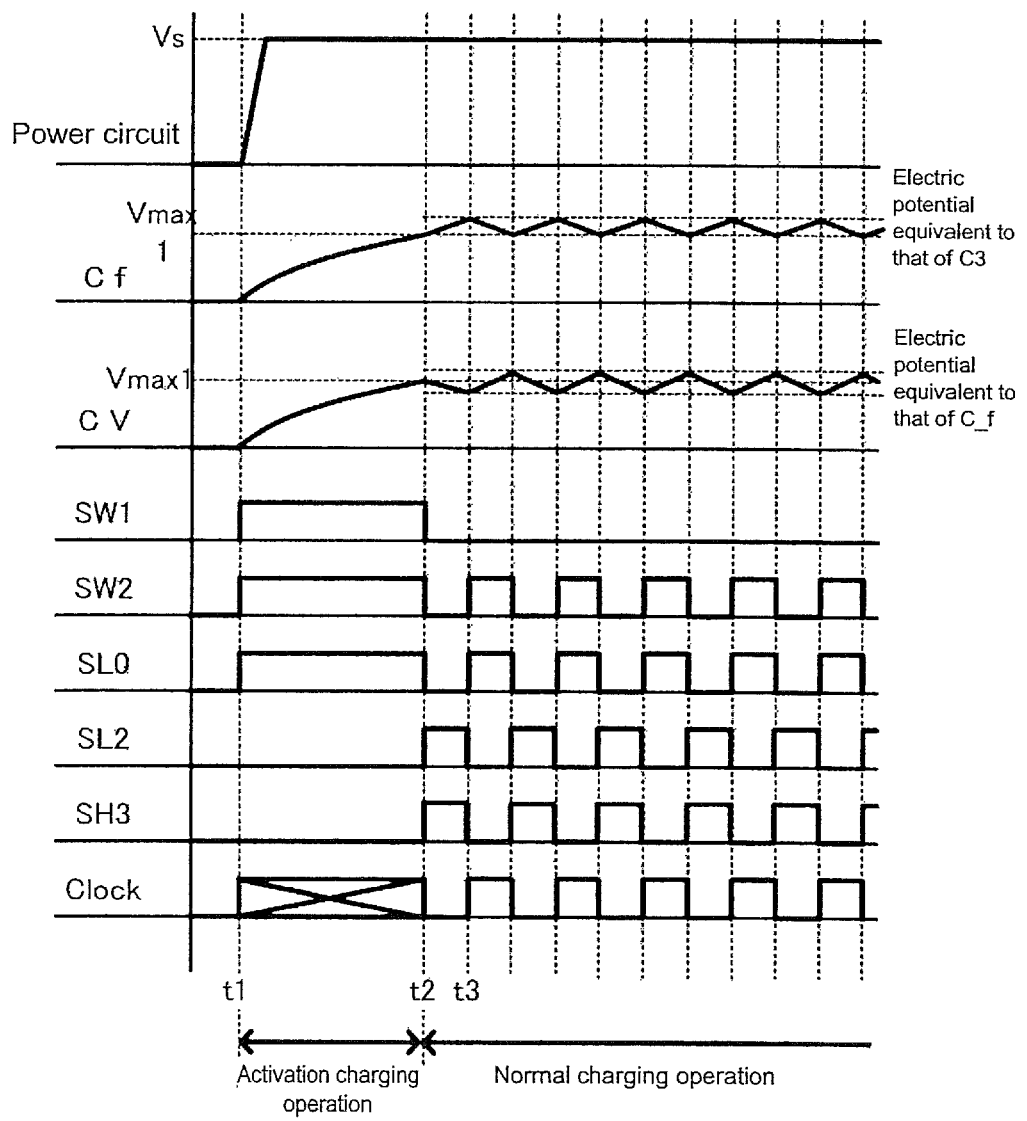
FIG. 4 shows a timing chart showing operation of a power supply apparatus according to the first embodiment.

For this reason, when the charge monitor 110 starts monitoring a charge state of the rechargeable battery cell unit 12, the first capacitor C_V and the second capacitor C_f are charged from the power circuit having a predetermined voltage Vs as shown in FIG. 4. In this way, the voltage of the first capacitor C_V can be raised to a predetermined power supply voltage in a short period of time as shown in FIG. 4. In this embodiment, the rechargeable battery cells C1 and C2 connected in series are used as the power circuit. Rechargeable battery cells in another configuration may be used as the power circuit. For example, three or more rechargeable battery cells connected in series may be used as the power circuit. When the charge monitor 110 starts monitoring a charge state of the rechargeable battery cell unit 12, a charging operation, during which the first capacitor C_V is charged to a predetermined power supply voltage, is referred to as "charging operation during activation."

Figure 6:
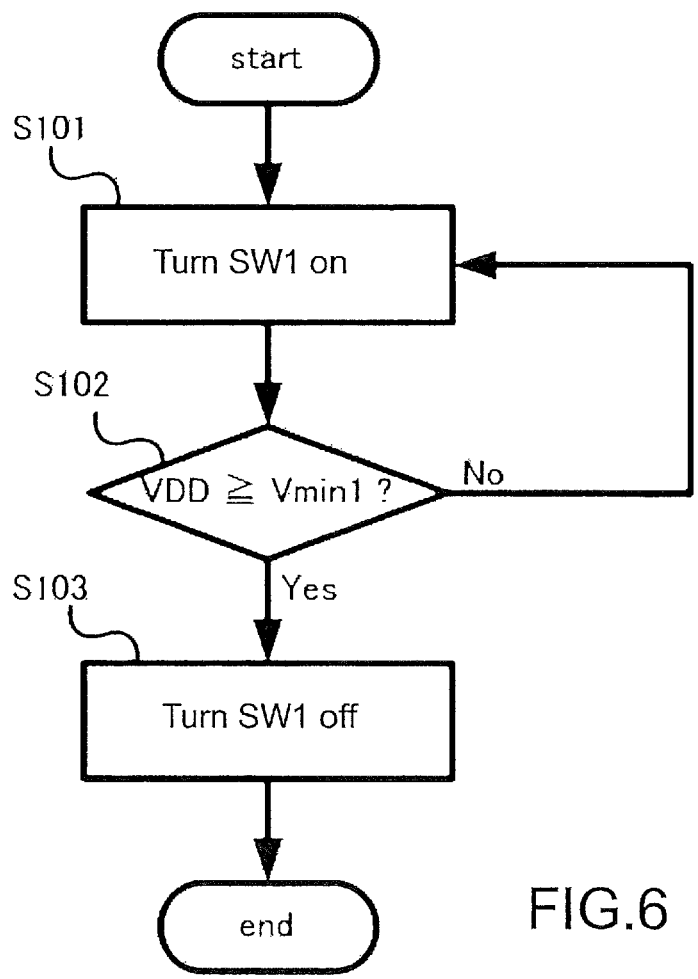
FIG. 6 shows a flowchart showing a process of charging operation during activation according to the first embodiment.

The charging operation during activation will be explained in detail with reference to FIG. 6. The power monitor 101, when starting monitoring a charge state of the rechargeable battery cell unit 12, controls the switch group so that the first switch SW1, the second switch SW2, and the low switch SL0 are turned on while switches other than these switches are turned off (Step S101). By this control, charging of the first capacitor C_V and the second capacitor C_f from the rechargeable battery cells C1 and C2 serving as the power circuit is started as shown in FIGS. 5A and 5B.

When the charging of the first capacitor C_V and the second capacitor C_f is started, the voltage of the first capacitor C_V and the voltage of the second capacitor C_f are raised as shown in FIG. 4. The power monitor 101 monitors the voltage of the first capacitor C_V, more specifically, a power supply voltage VDD of the other end of the first capacitor C_V. The power monitor 101 determines whether or not the power supply voltage VDD of the first capacitor C_V is equal to or higher than a first voltage Vmin 1 (Step S102 in FIG. 6). In this embodiment, the first voltage Vmin 1 is set to 2.9 V, which is higher than a minimum operating voltage (2.7 V) of the low-voltage circuit.

When the power supply voltage VDD of the first capacitor C_V does not exceed the first voltage Vmin 1 (No in Step S102), the power monitor 101 returns to Step S101 to allow the first capacitor C_V to be continuously charged. Meanwhile, when the power supply voltage VDD of the first capacitor C_V is equal to or higher than the first voltage Vmin 1 (Yes in Step S102), the power monitor 101 turns off the first switch SW1 and terminates the charging operation during activation (Step S103).

(Normal Charging Operation)

Explanation returns to FIG. 4. As shown in this figure, when the power supply voltage VDD of the first capacitor C_V and the power supply voltage VDD of the second capacitor C_f reach the first voltage Vmin 1, the power monitor 101 shifts operation from the activation charging operation to the normal charging operation. During the normal charging operation, the power monitor 101 performs normal charging processing, upper limit monitoring processing, and lower limit monitoring processing.

(Normal Charging Processing)

The normal charging processing will be explained in detail. In this processing, the second capacitor C_f performs charge pump operation on the basis of a clock signal generated by the logic circuit 113. The clock signal is generated only after a power supply voltage is supplied to the logic circuit 113. For this reason, as shown in FIG. 4, the clock signal is not generated from time t1 to time t2. The clock signal is generated after time t2 when the logic circuit 113 has been supplied with a power supply voltage VDD equal to or higher than a minimum operating voltage and started operating.

The power monitor 101 first controls the switch group so that the second capacitor C_f is charged from a predetermined rechargeable battery cell during a period when the clock signal is low (first period) (first control). Specifically, the power monitor 101 controls the switch group so that the second capacitor C_f is connected to a rechargeable battery cell having a highest voltage among the plurality of rechargeable battery cells C1 to C16 at the fall time of the clock signal. Here, the rechargeable battery cell C3 is used as the rechargeable battery cell having the highest voltage.

Figure 7A:
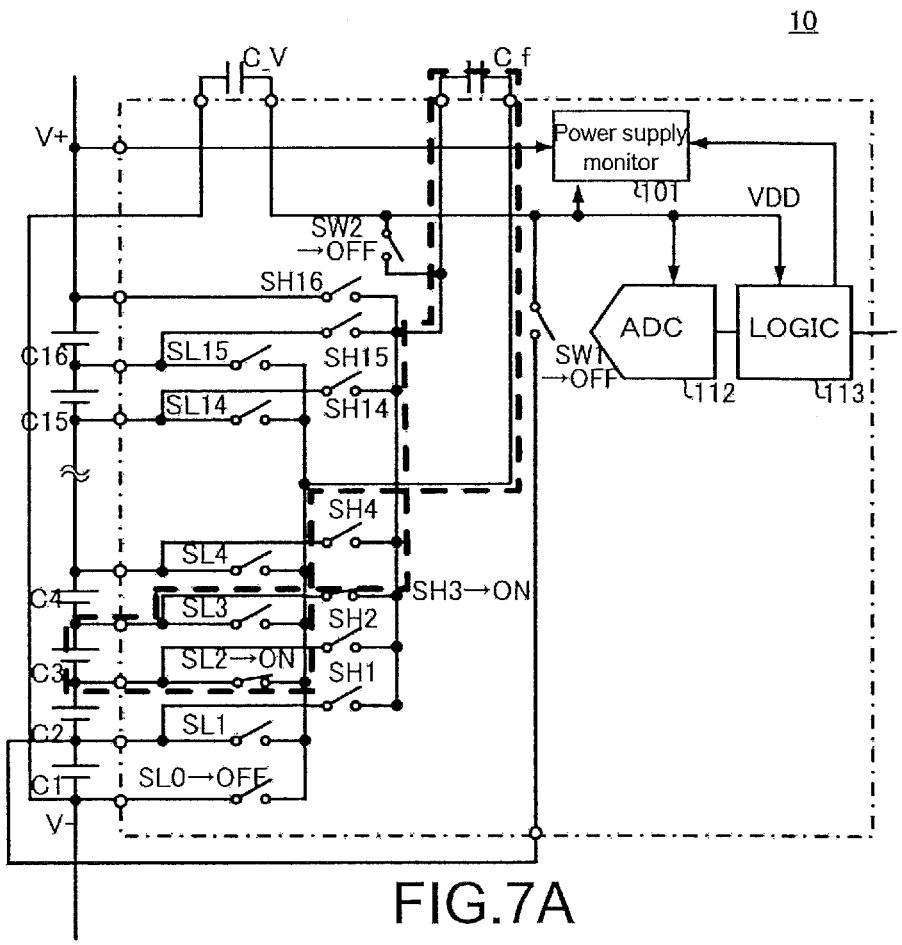
FIGS. 7A and 7B show the power supply apparatus during normal charging processing according to the first embodiment.
Figure 7B:
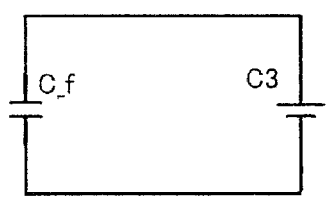

The power monitor 101 controls the switch group so that the low switch SL2 and the high switch SH3 are turned on while switches other than these switches are turned off at the fall time of the clock signal (time t2). By this control, as shown in FIG. 7A, one end of the second capacitor C_f is connected to the negative terminal of the rechargeable battery cell C3 while the other end of the second capacitor C_f is connected to the positive terminal of the rechargeable battery cell C3. FIG. 7B shows an equivalent circuit showing a connected state of the rechargeable battery module 10 in FIG. 7A. In this way, with the second capacitor C_f and the rechargeable battery cell C3 being connected to each other, the second capacitor C_f is charged such that the electric potential of the second capacitor C_f corresponds to the electric potential of the rechargeable battery cell C3.

Explanation returns to FIG. 4. Next, the power monitor 101 controls the switch group so that the first capacitor C_V is charged from the second capacitor C_f during a period when the clock signal is high (second period)(second control). Specifically, the power monitor 101 controls the switch group so that that the first capacitor C_V and the second capacitor C_f are connected to each other at the rise time of the clock signal.

Figure 8A:
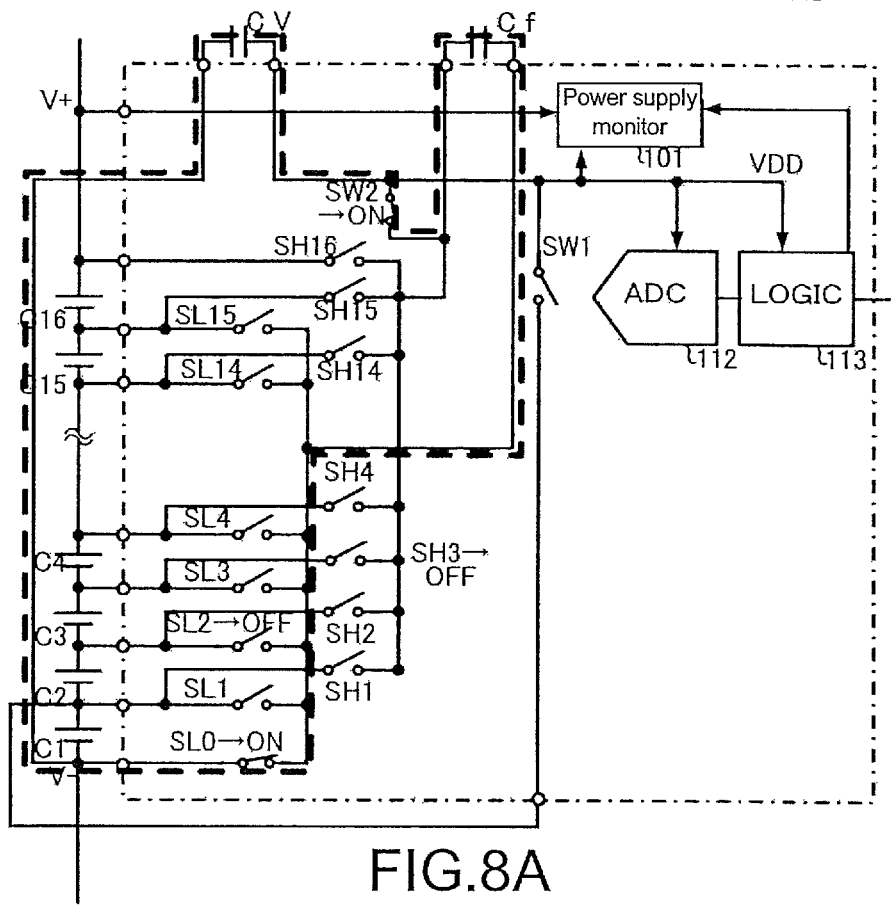
FIGS. 8A and 8B show the power supply apparatus during normal charging processing according to the first embodiment.
Figure 8B:
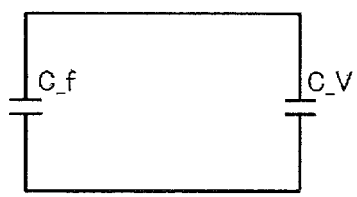

The power monitor 101 controls the switch group so that the second switch SW2 and the low switch SL0 are turned on while switches other than these switches are turned off at the rise time of the clock signal (time t3). By this control, as shown in FIG. 8A, one end of the first capacitor C_V is connected to one end of the second capacitor C_f while the other end of the first capacitor C_V is connected to the other end of the second capacitor C_f. FIG. 8B shows an equivalent circuit showing a connected state of the rechargeable battery module 10 in FIG. 8A. In this way, with the first capacitor C_V and the second capacitor C_f being connected to each other, the first capacitor C_V is charged from the second capacitor C_f such that the electric potential of the first capacitor C_V corresponds to the electric potential of the second capacitor C_f.

Then, the power monitor 101 controls the switch group so that the second capacitor C_f and a rechargeable cell having a maximum voltage are connected to each other in the subsequent first period. In this way, the power monitor 101 controls the switch group so that the first period, during which the second capacitor C_f and the rechargeable cell having the maximum voltage are connected to each other, and the second period, during which the first capacitor C_V and the second capacitor C_f are connected to each other, are repeated. By this control, the second capacitor C_f operates as a charge pump and the first capacitor C_V is charged to have a voltage within a predetermined voltage range by the second capacitor C_f.

In the above-mentioned normal charging processing, the first period is set as the period when the clock signal is low while the second period is set as the period when the clock signal is high. However, by setting each of the first period and the second period to be one cycle (high clock period and low clock period) of the clock signal, the first control and the second control may be repeated for every one cycle. The length of the first period of the first control and the length of the second period of the second control are determined on the basis of on-resistance of the switch group and a capacity value of the second capacitor C_f. The on-resistance of the switch group and the capacity value of the second capacitor C_f are determined such that a power supply voltage value or the like necessary for the charge monitor 110 is satisfied. In this embodiment, the charge monitor 101 selects a rechargeable cell having a maximum voltage on the basis of a notice from the logic circuit 113. If the charge monitor 101 is not able to select the rechargeable cell having the maximum voltage when, for example, operation has shifted from the activation charging operation to the normal charging operation, a predetermined rechargeable cell may be selected.

(Upper Limit Monitoring Processing)

Figure 9:
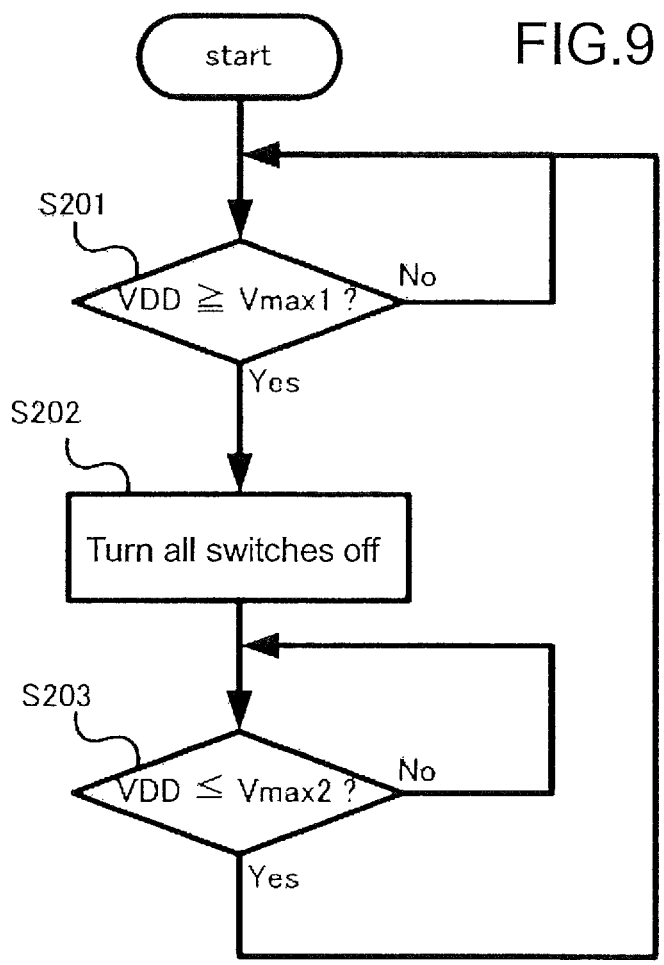
FIG. 9 shows a flowchart showing upper limit monitoring processing according to the first embodiment.

The upper limit monitoring processing executed by the power monitor 101 will be explained with reference to FIG. 9. This upper limit monitoring processing is executed to monitor whether or not the power supply voltage VDD of the first capacitor C_V exceeds a predetermined value when the power monitor 101 is performing the normal charging processing.

When performing the normal charging processing, the power monitor 101 monitors the power supply voltage VDD of the first capacitor C_V and determines whether or not the power supply voltage VDD is equal to or lower than a third voltage Vmax 1 (Step S201). In this embodiment, the third voltage Vmax 1 is set to 3.5 V, which is lower than a maximum operating voltage (3.6 V) of the low-voltage circuit.

When the power supply voltage VDD is lower than the third voltage Vmax 1 (No in Step S201), the power monitor 101 continues monitoring the power supply voltage VDD and normal charging processing. When the power supply voltage VDD is equal to or higher than the third voltage Vmax 1 (Yes in Step S201), the power monitor 101 interrupts the normal charging processing and controls the switch group so that all the switches are turned off (Step S202).

When the power monitor 101 turns off all the switches, the first capacitor C_V supplies a low power supply voltage and the first capacitor C_V is not charged from the second capacitor C_f. Therefore, the power supply voltage VDD of the first capacitor C_V is lowered.

The power monitor 101 monitors the power supply voltage VDD also after all the switches are turned off and determines whether or not the power supply voltage VDD is equal to or lower than a fourth voltage Vmax 2 (Step S203). When the power supply voltage VDD is higher than the fourth voltage Vmax 2 (No in Step S203), the power supply monitor 101 continues monitoring the power supply voltage VDD, with all the switches being turned off. Meanwhile, when the power supply voltage VDD is equal to or lower than the fourth voltage Vmax 2 (Yes in Step S203), the power monitor 101 restarts the interrupted normal charging processing and returns to Step S201 to continue monitoring the power supply voltage VDD. In this embodiment, the fourth voltage Vmax 2 is 3.4 V, which is lower than the third voltage Vmax 1.

(Lower Limit Monitoring Processing)

Figure 10:
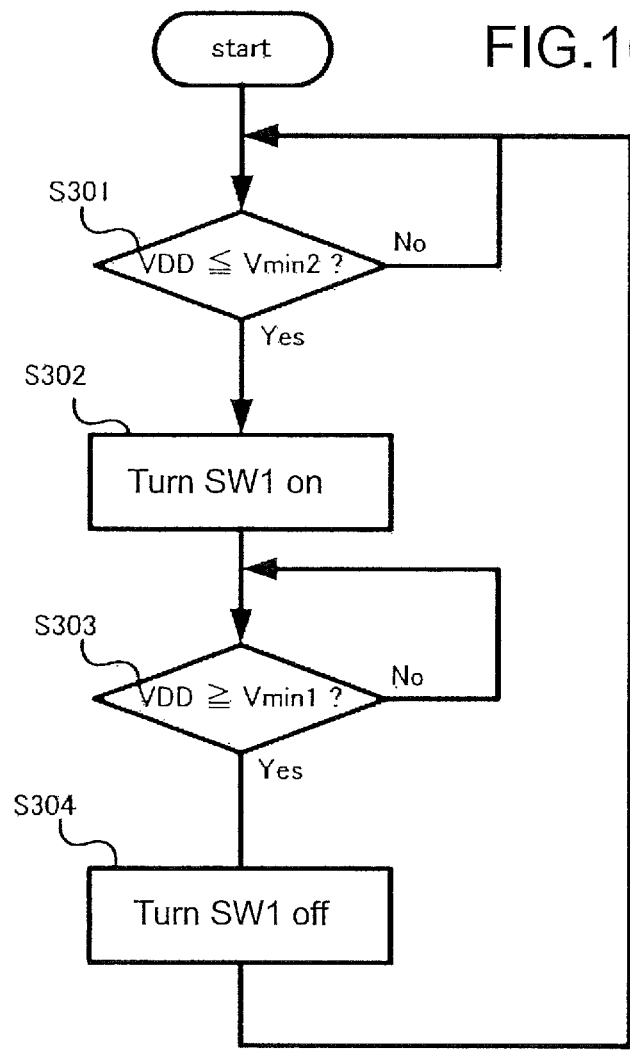
FIG. 10 shows a flowchart showing lower limit monitoring processing according to the first embodiment.

The lower limit processing executed by the power monitor 101 will be explained with reference to FIG. 10. This lower limit monitoring processing is executed to monitor whether or not the power supply voltage VDD of the first capacitor C_V is below a predetermined value when the power monitor is performing the normal charging processing.

When performing the normal charging processing, the power monitor 101 monitors the power supply voltage VDD of the first capacitor C_V and determines whether the power supply voltage VDD is equal to or lower than a second voltage Vmin 2 (Step S301). In this embodiment, the second voltage Vmin 2 is set to 2.8 V, which is higher than the minimum operating voltage (2.7 V) of the low-voltage circuit.

When the power supply voltage VDD is higher than the second voltage Vmin 2 (No in Step S301), the power monitor 101 continues monitoring the power supply voltage VDD and the normal charging processing. When the power supply voltage VDD is equal to or lower than the second voltage Vmin 2 (Yes in Step S301), the power monitor 101 interrupts the normal charging processing and controls the switch group so that the first capacitor C_V is charged from the power circuit (the rechargeable cells C1 and C2 in this embodiment), which is a stable power supply. Specifically, the power monitor 101 controls the switch group so that the first switch SW1, the second switch SW2, and the low switch SL0 are turned on while switches other than these switches are turned off (Step S302). By this control, the rechargeable battery module 10 is held in the connected state as shown in FIGS. 5A and 5B, and the first capacitor C_V and the second capacitor C_f are charged from the rechargeable battery cells C1 and C2, which serve as the power circuit. Hence, the power supply voltage VDD of the first capacitor C_V and the power supply voltage VDD of the second capacitor C_f are raised.

The power monitor 101 monitors the power supply voltage VDD also after the first switch SW1, the second switch SW2, and the low switch SL0 are turned on. The power monitor 101 determines whether or not the power supply voltage VDD is equal to or higher than the first voltage Vmin 1 (Step S303). When the power supply voltage VDD is lower than the first voltage Vmin 1 (No in Step S303), the power monitor 101 continues monitoring the power supply voltage VDD, with the first switch SW1, the second switch SW2, and the low switch SL0 being turned on. Meanwhile, when the power supply voltage VDD is equal to or higher than the first voltage vmin 1 (Yes in Step S303), the power monitor 101 restarts the interrupted normal charging processing and returns to Step S301 to continue monitoring the power supply voltage VDD. Here, the first voltage Vmin 1 is higher than the second voltage Vmin 2. In this embodiment, as discussed above, the first voltage Vmin 1 is set to 2.9 V.

As thus explained, by the power monitor 101 executing the upper limit monitoring processing and the lower limit monitoring processing while performing the normal charging processing, it is possible to keep the power supply voltage VDD of the first capacitor C_V within an appropriate voltage range within which the low-voltage circuit can be operated. In order to determine whether or not the power supply voltage VDD is within the appropriate voltage range, two thresholds are used for each of the upper and lower limits, providing hysteresis for determination. This can prevent the power supply voltage VDD from becoming unstable and departing from the appropriate voltage range when a charge target of the first capacitor C_V is switched to another charge target.

Next, a configuration example of the power monitor 101 will be explained with reference to FIG. 11. The power monitor 101 has a reference voltage generating unit 121, first and second comparators 122 and 123, and a control signal generating unit 124.

The reference voltage generating unit 121 generates a reference voltage to be used by the power monitor 101 for determination in the activation charging operation, the upper limit monitoring operation, and the lower limit monitoring operation. As described below, since the first and second comparators 122 and 123 have hysteresis, the reference voltage is determined taking into account the hysteresis.

The first comparator 122 is a circuit for determining whether or not the power supply voltage VDD is equal to or higher than the third voltage Vmax 1 and whether or not the power supply voltage VDD is equal to or lower than the fourth voltage Vmax 2. To the first comparator 122, the power supply voltage VDD and the reference voltage generated by the reference voltage generating unit 121 are input. The first comparator 122 outputs a high signal when the power supply voltage VDD is equal to or higher than the third voltage Vmax 1. The first comparator 122 outputs a low signal when the power supply voltage VDD is equal to or lower than the fourth voltage Vmax 2. In this way, the first comparator 122 has hysteresis.

The second comparator 123 is a circuit for determining whether or not the power supply voltage VDD is equal to or higher than the first voltage Vmin 1 and whether or not the power supply voltage VDD is equal to or lower than the second voltage Vmin 2. To the second comparator 123, the power supply voltage VDD and the reference voltage generated by the reference voltage generating unit 121 are input. The second comparator 123 outputs a high signal when the power supply voltage VDD is equal to or higher than the first voltage Vmin 1. The second comparator 123 outputs a low signal when the power supply voltage VDD is equal to or lower than the second voltage Vmin 2. In this way, the second comparator 123 has hysteresis.

The control signal generating unit 124 generates a control signal for controlling the switch group on the basis of the outputs of the first and second comparators 122 and 123, and a clock signal obtained from the logic circuit 113.

The control signal generating unit 124 starts the activation charging operation, upon receiving, for example, from the charge monitoring controller 3 an instruction to start monitoring a rechargeable battery cell. Starting the activation charging operation, the control signal generating unit 124 first generates a control signal for turning on the first and second switches SW1 and SW2 and the low switch SL0 while turning off switches other than these switches. With this signal, the first capacitor C_V and the second capacitor C_f are charged.

Upon the reception of the high signal input from the second comparator 123 during the activation charging operation, the control signal generating unit 124 determines that the power supply voltage VDD is equal to or higher than the first voltage Vmin 1, and controls the switch group so that the activation charging operation is terminated and then operation is shifted to the normal charging operation. Specifically, as shown in FIG. 4, a control signal for turning on the low switch SL2 and the high switch SH3 while turning off switches other than these switches is generated. After generating this signal, the control signal generating unit 124 alternately generates, on the basis of a clock signal, a control signal for turning on the second switch SW2 and the low switch SL0 while tuning off switches other than these switches and a control signal for turning on the low switch SL2 and the high switch SH3 while turning off switches other than these switches.

Upon the reception of the high signal input from the first comparator 122 during the normal charging processing, the control signal generating unit 124 determines that the power supply voltage VDD is equal to or higher than the third voltage Vmax 1, and generates a control signal for turning off all the switches. When the output of the first comparator 122 changes from the high signal to the low signal, the control signal generating unit 124 determines that the power supply voltage VDD is equal to or lower than the fourth voltage Vmax 2, and returns to the normal charging processing.

Upon the reception of the low signal input from the second comparator 123 during the normal charging processing, the control signal generating unit 124 determines that the power supply voltage VDD is equal to or lower than the second voltage Vmin 2, and generates a control signal for turning on the first switch SW1, the second switch SW2, and the low switch SL0 while turning off switches other than these switches. When the output of the second comparator 123 changes from the low signal to the high signal, the control signal generating unit 124 determines that the power supply voltage VDD is equal to or higher than the first voltage Vmin 1, and returns to the normal charging processing.

As thus explained, the power supply apparatus 100 in the first embodiment uses the second capacitor C_f as the charge pump and charges the first capacitor C_V from the rechargeable battery cell having the maximum voltage. By this charging, a power supply voltage can be supplied to a low-voltage circuit without using a step-down circuit. Therefore, the power supply apparatus 100 can supply a power voltage to a monitoring circuit with low power consumption because power consumption for stepping down voltage is suppressed.

Figure 11:
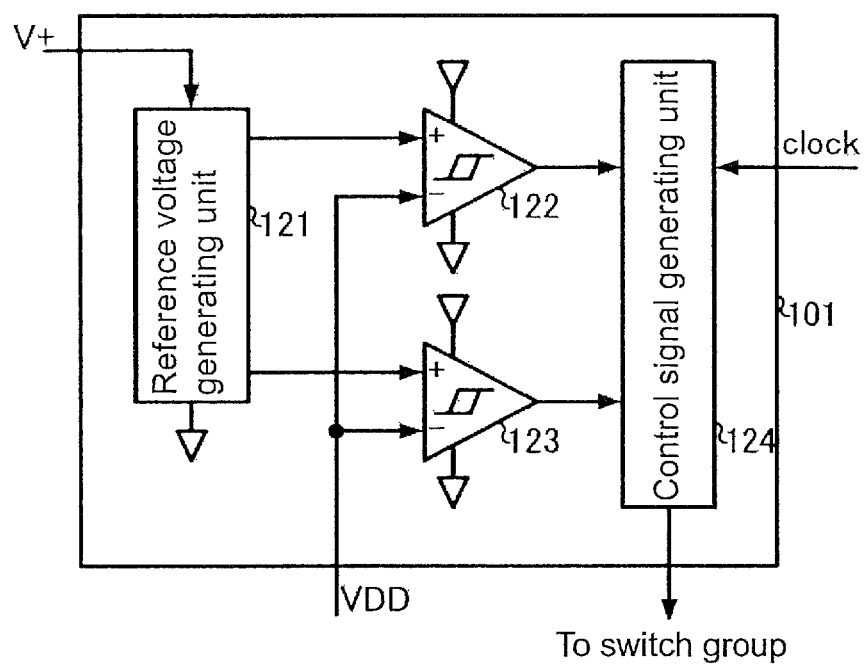
FIG. 11 shows a power supply monitor according to the first embodiment.

Although not illustrated in figures, each component of the power monitor 101 shown in FIG. 11 receives a power voltage supply from the rechargeable battery cell unit 12, with a first power supply electric potential and a second power supply electric potential being connected to a positive terminal V+ and a negative terminal V− of the rechargeable battery cell unit 12. Each of these components of the power monitor 101 can be formed to have a configuration in which a large electric current is not necessary and only minimum electric current of appropriately from several μAs to a few tens of μAs, for example, is necessary. Therefore, a configuration that has almost no impact on the power consumption of the power supply apparatus 100 can be realized.

By charging the second capacitor C_f from the rechargeable battery cell having the maximum voltage, the voltage of the rechargeable battery cell having the maximum voltage is lowered. Thus, cell balancing of the plurality of rechargeable battery cells and charging the second capacitor C_f can be both achieved.

In this embodiment, the cell selector 102 and the measurement cell selector 111 are provided separately. However, the measurement cell selector 111 may be omitted by setting the charge monitor 110 and the power supply apparatus 100 to share the cell selector 102.

(Modification 1)

Next, a modification of the first embodiment will be explained. In this modification, processing to be implemented when a power supply voltage VDD exceeds an upper limit in upper limit monitoring processing is different from that in the first embodiment.

Figure 12:
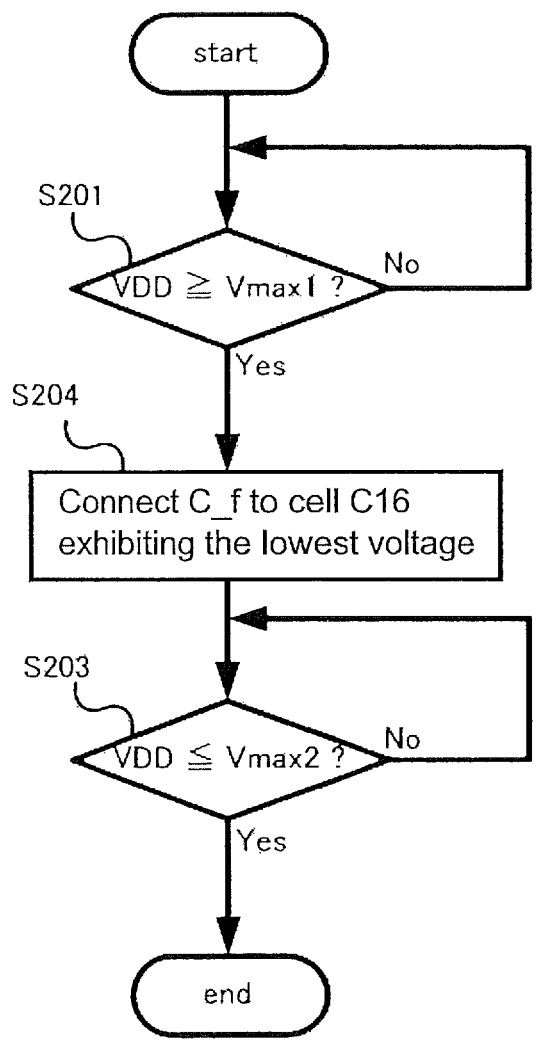
FIG. 12 shows a flowchart showing the upper limit monitoring processing according to a modification of the first embodiment.

Upper limit monitoring processing according to this modification will be explained with reference to FIG. 12. As in the first embodiment, the power monitor 101 determines whether or not the power supply voltage VDD is equal to or higher than the third voltage Vmax 1 in Step S201.

When the power supply voltage VDD is equal to or higher than the third voltage Vmax 1 (Yes in Step S201), the power monitor 101 interrupts the normal charging processing and controls the switch group so that the second capacitor C_f and a rechargeable cell having a lowest voltage are connected to each other (Step S204). Here, the explanation is given on the assumption that the rechargeable battery cell C16 is used as the rechargeable battery cell having the lowest voltage.

Figure 13:
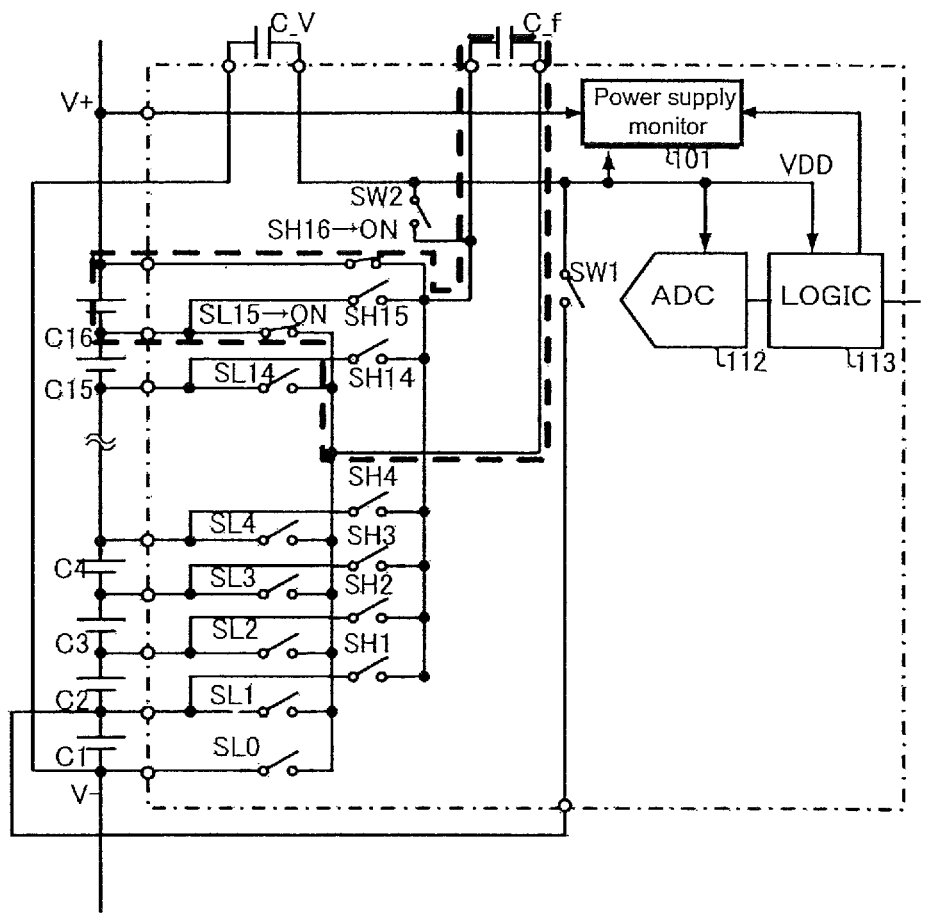
FIG. 13 shows the power supply apparatus during the upper limit monitoring processing according to the modification of the first embodiment.

When the power supply voltage VDD is equal to or higher than the third voltage Vmax 1, the power monitor 101 interrupts the normal charging processing and controls the switch group so that the high switch SH16 and the low switch SL15 are turned on while switches other than these switches are turned off. By this control, as shown in FIG. 13, the second capacitor C_f and the rechargeable battery cell C16 having the minimum voltage are connected to each other and the rechargeable battery cell C16 is charged by the second capacitor C_f. With the second capacitor C_f and the rechargeable battery cell C16 being connected to each other, the first capacitor C_V is not charged from the second capacitor C_f such that the power supply voltage VDD of the first capacitor C_V is lowered.

The power monitor 101 monitors the power supply voltage VDD also after the connection between the second capacitor C_f and the rechargeable battery cell C16 having the minimum voltage is established, and determines whether or not the power supply voltage VDD is equal to or higher than the fourth voltage Vmax 2 (Step S203). Processing subsequent to this operation is similar to the upper limit monitoring processing explained with reference to FIG. 9.

As thus explained, in this modification, by charging the rechargeable battery cell having the minimum voltage from the second capacitor C_f, cell balancing of the rechargeable battery cells to keep a predetermined voltage can be performed.

In this modification, the second capacitor C_f charges only the rechargeable battery cell C16. However, when a charge target is changed from the rechargeable battery cell C16 having the minimum voltage to another rechargeable battery cell, the power monitor 101 may switch a connection target of the second capacitor C_f from the rechargeable battery cell C16 to another rechargeable battery cell. The logic circuit 113 gives a notice of the rechargeable cell having the maximum voltage.

In this modification, when the power supply voltage VDD is equal to or higher than the third voltage Vmax 1 during the upper limit monitoring processing, the rechargeable cell having the minimum voltage is charged. Alternatively, charging of the rechargeable cell having the minimum voltage may be simultaneously performed when the first capacitor C_V is being charged from the second capacitor C_f. Alternatively, a cell balancing operation period may be established, in which the normal charging operation is interrupted and the rechargeable battery cell having the minimum voltage is charged from the second capacitor C_f for a predetermined period of time.

Second Embodiment

Figure 14A:
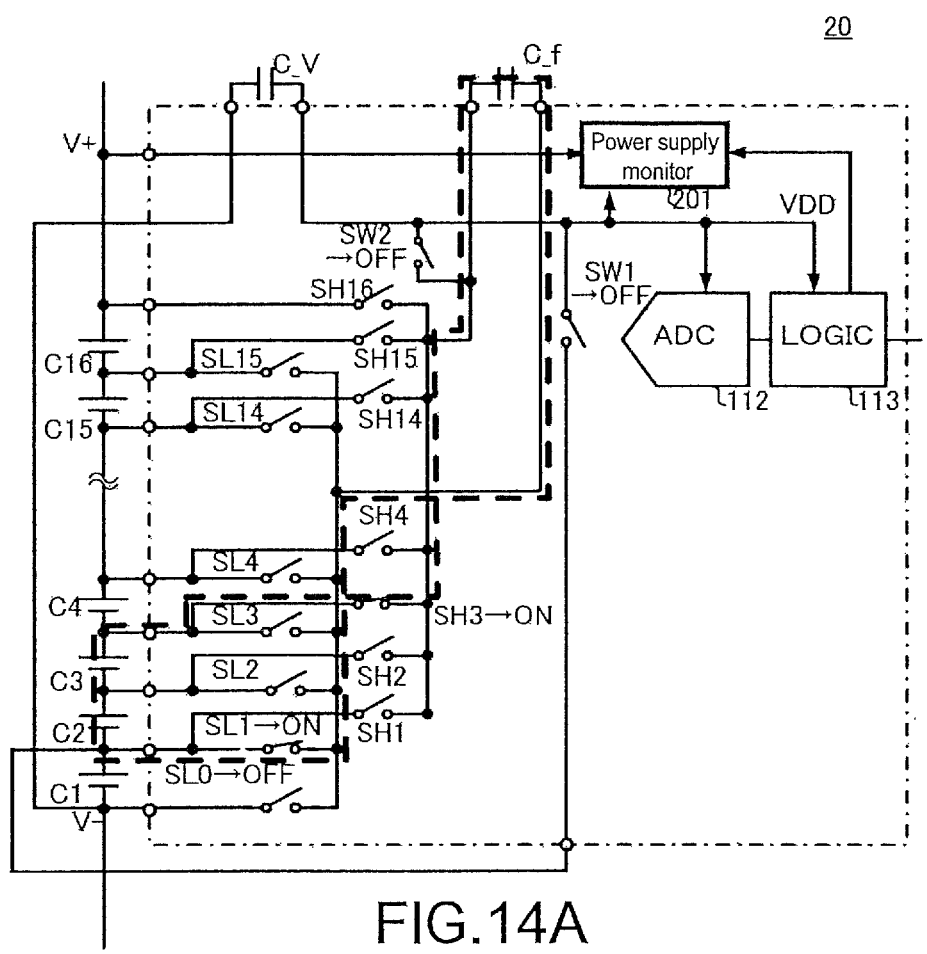
FIGS. 14A and 14B show a rechargeable battery module according to a second embodiment of the present disclosure.
Figure 14B:
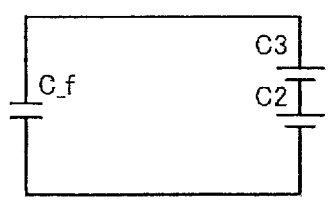

A rechargeable battery module 20 according to a second embodiment will be explained with reference to FIGS. 14A and 14B. The rechargeable battery module 20 according to this embodiment differs from the first embodiment in that the second capacitor C_f is charged from a rechargeable battery cell having a maximum voltage and a rechargeable battery cell connected in series to this rechargeable battery cell having the maximum voltage. Except for this difference, the rechargeable battery module 20 in the second embodiment has the same as that of the rechargeable battery module 10 in the first embodiment, and the rechargeable battery module 20 is installed to the charging apparatus 1.

A power monitor 201 according to this embodiment controls the switch group so that the second capacitor C_f is charged from a predetermined rechargeable battery cell during a period when a clock signal is low (first period) during the normal charging processing (first control). In this embodiment, the power monitor 201 selects as a predetermined rechargeable battery cell a rechargeable battery cell having a maximum voltage and a rechargeable battery cell connected in series to this rechargeable battery cell having the maximum voltage. Here, the explanation is given on the assumption that the rechargeable battery cell C3 is used as the rechargeable battery cell having the maximum voltage and the power monitor 201 selects the rechargeable battery cell C3 and the rechargeable battery cell C2 connected in series to the rechargeable battery cell C3.

The power monitor 201 controls the switch group so that the low switch SL1 and the high switch SH3 are turned on while switches other than these switches are turned off at the fall time of the clock signal during the normal charging processing. By this control, as shown FIG. 14A, one end of the second capacitor C_f is connected to a negative terminal of the rechargeable battery cell C2 while the other end of the second capacitor C_f is connected to a positive terminal of the rechargeable battery cell C3. FIG. 14B shows an equivalent circuit showing a connected state of the rechargeable battery module 20 in FIG. 14A. In this way, by connecting the second capacitor C_f to the rechargeable battery cells C2 and C3, the second capacitor C_f is charged from the rechargeable battery cells C2 and C3. Other than this operation, operations in the second embodiment are the same as those in the first embodiment.

As thus explained, the rechargeable battery module 20 according to the second embodiment is able to yield effects similar to those in the first embodiment, and moreover the second capacitor C_f in the second embodiment can be charged to a higher voltage as compared to the first embodiment since a plurality of rechargeable battery cells are used to charge the second capacitor C_f in the second embodiment. Therefore, this embodiment is useful when a higher power supply voltage VDD is to be supplied to a low-voltage circuit, as represented by a case where consumption current of the ADC 112 or the logic circuit 113 is high or a case where the power supply voltage VDD is also supplied to a low-voltage circuit in addition to the ADC 112 and the logic circuit 113.

In the above-mentioned embodiment, the second capacitor C_f is charged from two rechargeable battery cells, but the second capacitor C_f may be charged by three or more rechargeable battery cells connected in series.

Third Embodiment

Figure 15:
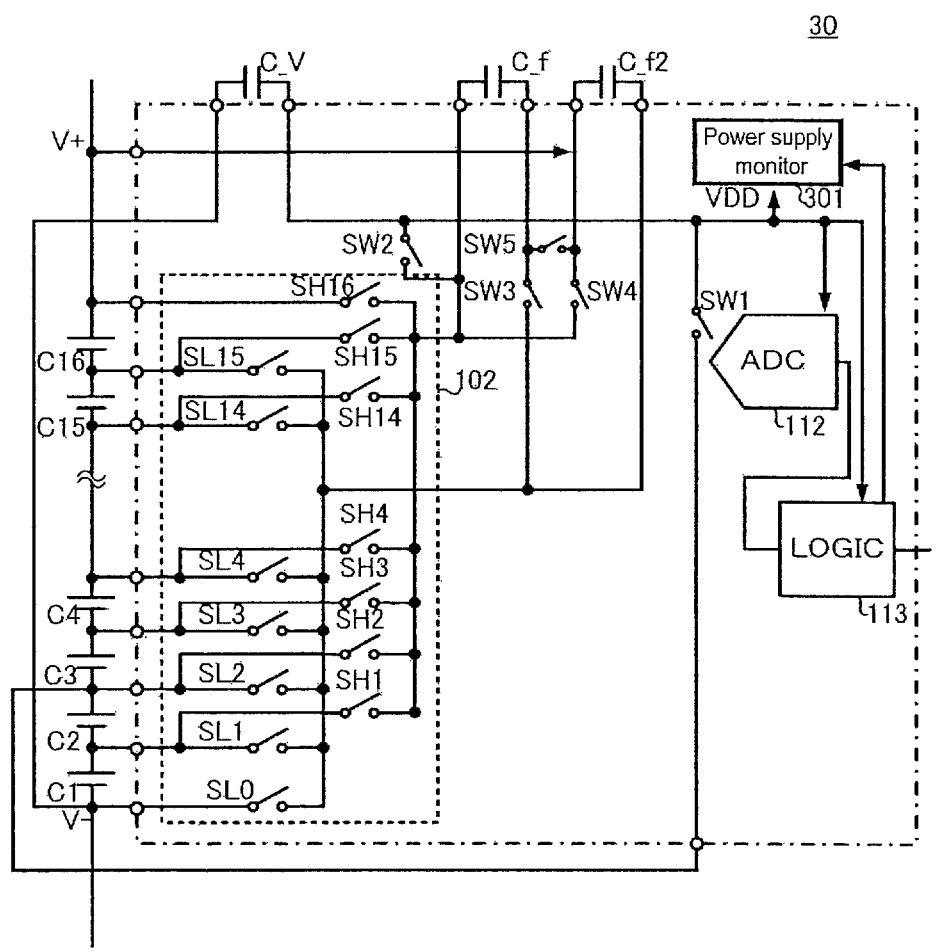
FIG. 15 shows a rechargeable battery module according to a third embodiment of the present disclosure.

Next, a rechargeable battery cell 30 according to a third embodiment will be explained with reference to FIG. 15. The rechargeable battery cell 30 according to this embodiment has a third capacitor C_f 2 and third to fifth switches SW3 to SW5. Other than this configuration, the rechargeable battery module 30 in the third embodiment has the same configuration as that of the rechargeable battery module 10 in the first embodiment, and the rechargeable battery module 30 is installed to the charging apparatus 1.

One end of the third capacitor C_f 2 is connected to ends on the other side of the low switches SL0 to SL15 while the other end of the third capacitor C_f 2 is connected to ends on the other side of the high switches SH1 to SH16 via the fourth switch SW4. The other end of the third capacitor C_f 2 is connected to one end of the second capacitor C_f via the fifth switch SW5. The third capacitor C_f 2 operates as a charge pump that charges the first capacitor C_V.

One end of the third switch SW3 is connected to the second capacitor C_f while the other end of the third switch SW3 is connected to ends on the other side of the low switches SL0 to SL15.

A power monitor 301 operates as a controller that controls the cell selector 102 and the first to fifth switches SW1 to SW5 on the basis of a value of a power supply voltage VDD or a clock signal of the logic circuit 113. The cell selector 102 and the first to fifth switches SW1 to SW5 are also collectively referred to as a switch group. The power monitor 301 controls the switch group to control the charging and discharging of the first to third capacitors C_V, C_f, and C_f 2.

Figure 16A:
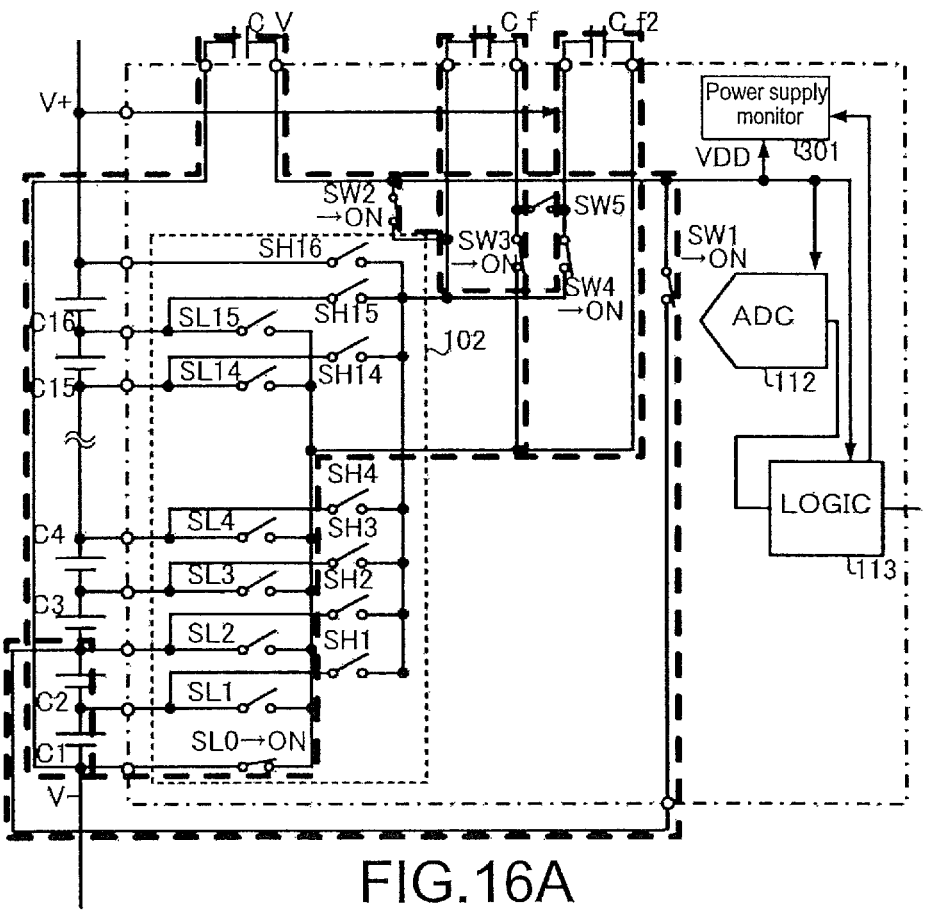
FIGS. 16A and 16B show a power supply apparatus at the time of charging operation during activation according to the third embodiment.

Next, operation of the rechargeable battery module 30 will be explained. First, the charging operation during activation will be explained with reference to FIGS. 16A and 16B.

(Charging Operation During Activation)

Figure 16B:
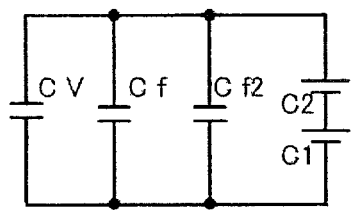

The power monitor 301 controls the switch group so that the low switch SL0 and the first to fourth switches SW1 to SW4 are turned on while switches other than these switches are turned off. By this control, the first to third capacitors C_V, C_f, and C_f 2 and the rechargeable battery cells C1 and C2 connected in series are connected in parallel as indicated by the dashed line in FIG. 16A. FIG. 16B shows an equivalent circuit showing a connected state of the rechargeable battery module 30 in FIG. 16A. The first to third capacitors C_V, C_f, and C_f 2 are charged from the rechargeable battery cells C1 and C2. Operations other than this operation are the same as those in the first embodiment.

(Normal Charging Operation)

When the power supply voltage VDD of the first capacitor C_V reaches the first voltage Vmin 1, the power monitor 301 shifts operation from the charging operation during activation to the normal charging operation. During the normal charging operation, the power monitor 301 performs normal charging processing, upper limit monitoring processing, and lower limit monitoring processing as in the power monitor in the first embodiment.

(Normal Charging Operation)

In the normal charging operation, the second capacitor C_f and the third capacitor C_f 2 perform charge pump operation on the basis of a clock signal generated by the logic circuit 113. The power monitor 301 connects the second capacitor C_f and the third capacitor C_f 2 in parallel to be charged from the rechargeable battery cell C3 having a maximum voltage during a period when the clock signal is low (first period). Specifically, the power monitor 301 controls the switch group so that the low switch SL2, the high switch SH3, and the third and fourth switches SW3 and SW4 are turned on while switches other than these switches are turned off at the fall time of the clock signal.

Figure 17A:
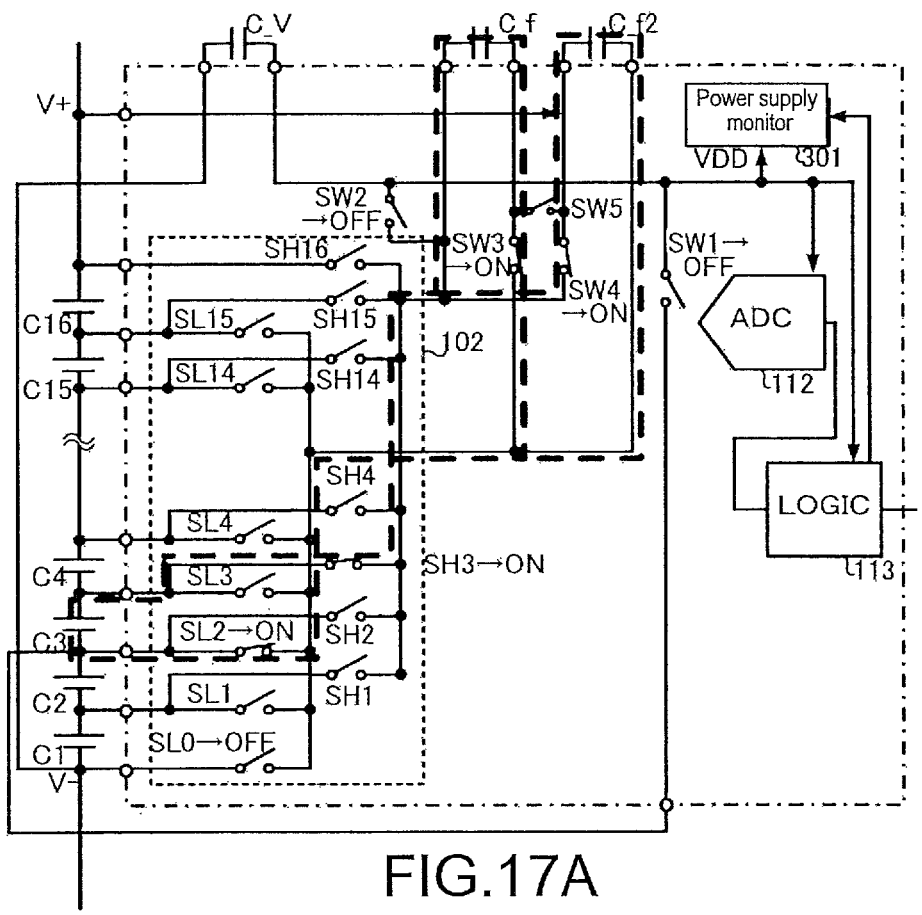
FIGS. 17A and 17B show the power supply apparatus during normal charging processing according to the third embodiment.
Figure 17B:
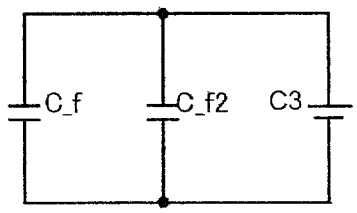

By this control, as shown in FIG. 17A, ends on one side of the second capacitor C_f and the third capacitor C_f 2 are connected to a negative terminal of the rechargeable battery cell C3 and ends on the other side of the second capacitor C_f and the third capacitor C_f 2 are connected to the positive terminal of the rechargeable battery cell C3. FIG. 17B shows an equivalent circuit showing a connected state of the rechargeable battery module 30 in FIG. 17A. In this way, by connecting the second and third capacitors C_f and C_f 2 to the rechargeable battery cell C3 in parallel, the second and third capacitors C_f and C_f 2 are charged such that the electric potential of the second capacitor C_f and the electric potential of third capacitors C_f 2 correspond to the electric potential of the rechargeable battery cell C3.

Next, the power monitor 301 charges the first capacitor C_V by connecting the second capacitor C_f and the third capacitor C_f 2 to each other in series during a period when the clock signal is high (second period). Specifically, the power monitor 301 controls the switch group so that the low switch SL, the second switch SW2, and the fifth switch SW5 are turned on while switches other than these switches are turned off at the rise time of the clock signal.

Figure 18A:
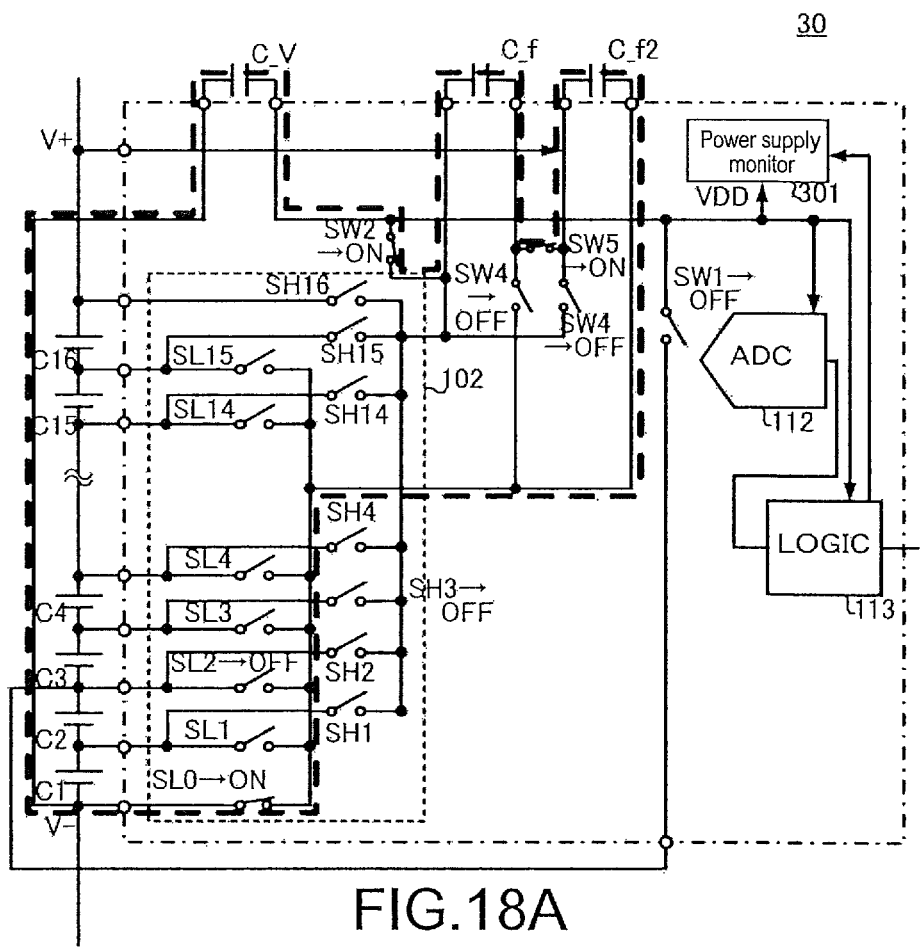
FIGS. 18A and 18B show the power supply apparatus during normal charging processing according to the third embodiment.
Figure 18B:
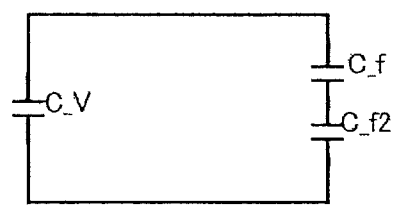

By this control, the second and third capacitors C_f and C_f 2 connected in series are connected to the first capacitor C_V in parallel as shown in FIG. 18A. FIG. 18B shows an equivalent circuit showing a connected state of the rechargeable battery module 30 in FIG. 18A. In this way, with the second and third capacitors C_f and C_f 2 being connected in series to each other, the first capacitor C_V is charged such that the electric potential of the first capacitor C_V corresponds to a combined electric potential of the second and third capacitors C_f and C_f 2. Hence, the first capacitor C_V is charged such that the electric potential of the first capacitor C_V is about twice as high as the electric potential of the rechargeable battery cell C3.

As thus explained, by performing charge pump operation using the third capacitor C_f 2 in addition to the second capacitor C_f, the voltage of the rechargeable cell C3 is approximately doubled before charging the first capacitor C_V.

In the above-mentioned embodiment, the use of two capacitors (the second capacitor C_f and the third capacitor C_f 2) to perform charge pump operation has been explained. However, the charge pump operation may be performed using three or more capacitors.

As thus explained, the rechargeable battery module 30 according to the third embodiment yields the same effects similar to those in the first embodiment. Moreover, due to the provision of the third capacitor C_f 2, the voltage of the rechargeable cell C3 is raised before charging the first capacitor C_V. This embodiment is useful when a greater power supply voltage VDD is to be supplied to a low-voltage circuit, as represented by a case where consumption current of the ADC 112 or the logic circuit 113 is high or a case where the power supply voltage VDD is also supplied to a low-voltage circuit in addition to the ADC 112 and the logic circuit 113.

Fourth Embodiment

Figure 19:
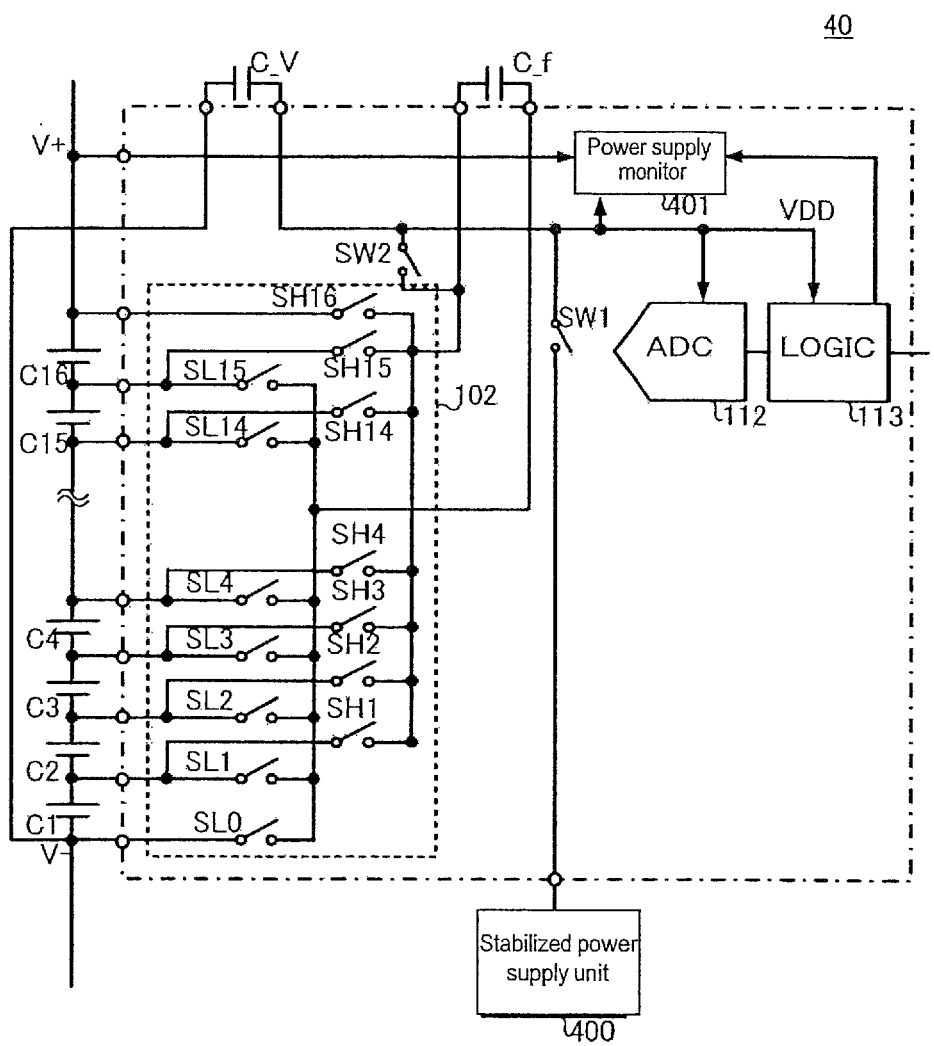
FIG. 19 shows a rechargeable battery module according to a fourth embodiment of the present disclosure.

A rechargeable battery module 40 according to a fourth embodiment will be explained with reference to FIG. 19. The rechargeable battery module 40 according to this embodiment differs from the first embodiment in that a stabilized power supply unit 400 is used as a power supply circuit. Except for this difference, the rechargeable battery module 40 in the fourth embodiment has the same configuration as that of the rechargeable battery module 10 in the first embodiment, and the rechargeable battery module 40 is installed to the charging apparatus 1.

The stabilized power supply unit 400 is constituted of, for example, a constant-voltage circuit. This stabilized power supply unit 400 is connected to the first capacitor C_V via the first switch SW1 and charges the first capacitor C_V.

A power monitor 401 controls the switch group so that the first switch SW1 is turned on while switches other than this first switch are turned off when it is determined that in the lower limit monitoring processing, the power supply voltage VDD is equal to or lower than the second voltage Vmin 2 and that charging has to be performed from the power supply circuit (Yes in Step S301 in FIG. 10) or when the charging operation during activation is executed. By this control, the first capacitor C_V is charged from the stabilized power supply unit 400 serving as the power supply circuit.

As thus explained, the rechargeable battery module 40 according to the fourth embodiment yields the same effects similar to those in the first embodiment, and by providing the stabilized power supply unit 400 serving as the power supply circuit, the first capacitor C_V can be charged more stably.

In this embodiment, adoption of the stabilized power supply unit 400 to the rechargeable battery module 10 according to the first embodiment has been explained, but the stabilized power supply unit 400 may also be adopted to the rechargeable battery module 20 according to the second embodiment or the rechargeable battery module 30 according to the third embodiment.

Fifth Embodiment

Figure 20:
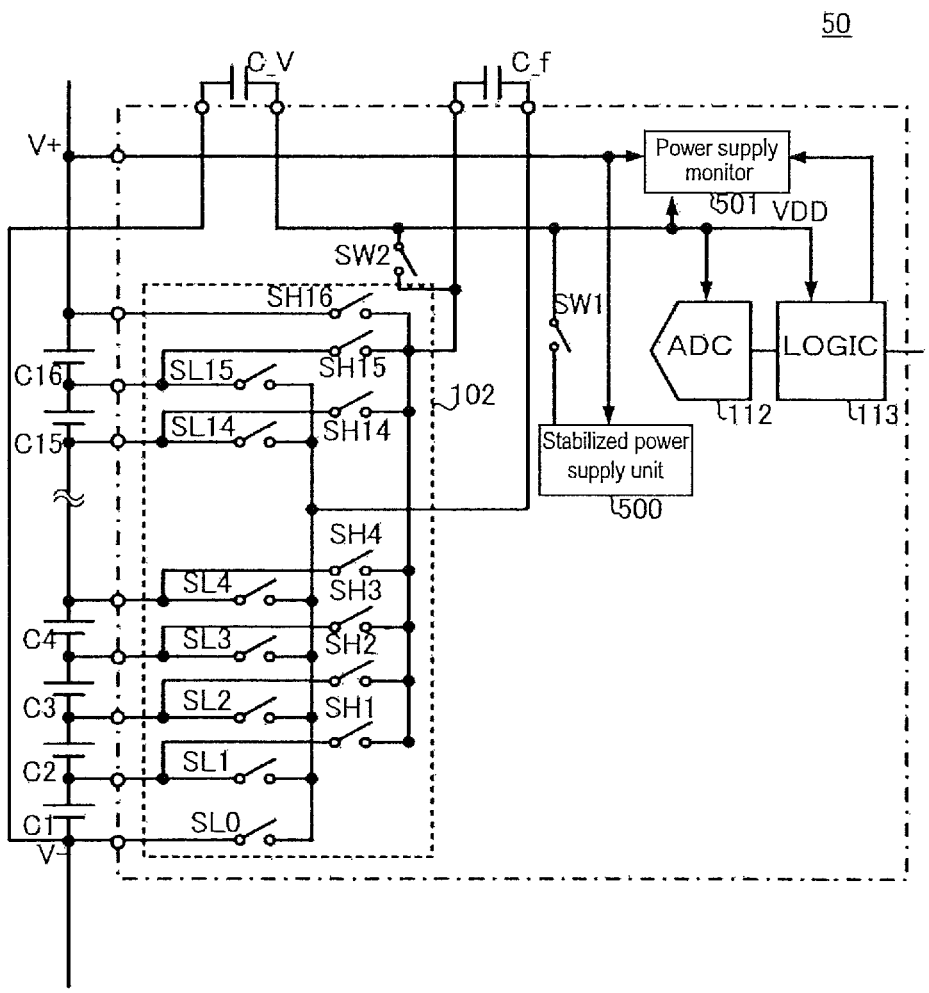
FIG. 20 shows a rechargeable battery module according to a fifth embodiment of the present disclosure.

A rechargeable battery module 50 according to a fifth embodiment will be explained with reference to FIG. 20. The rechargeable battery module 50 according to this embodiment differs from the first embodiment in that the rechargeable battery cell unit 12 and a stabilized power supply unit 500 are used as power supply circuits. Except for this difference, the rechargeable battery module 50 in the fifth embodiment has the same configuration as that of the rechargeable battery module 10 in the first embodiment, and the rechargeable battery module 50 is installed to the charging apparatus 1.

The stabilized power supply unit 500 is constituted of, for example, a step-down circuit. This stabilized power supply unit 500 is connected to the first capacitor C_V via the first switch SW1. The stabilized power supply unit 500 steps down the voltage of the rechargeable battery cell unit 12 before charging the first capacitor C_V.

A power monitor 501 controls the switch group so that the first switch SW1 is turned on while switches other than this first switch are turned off when it is determined that in the lower limit monitoring processing, the power supply voltage VDD is equal to or lower than the second voltage Vmin 2 and that charging has to be performed from the power supply circuit (Yes in Step S301 in FIG. 10) or when the charging operation during activation is executed. By this control, the first capacitor C_V is charged from the stabilized power supply unit 400 serving as the power supply circuit.

As thus explained, the rechargeable battery module 50 according to the fifth embodiment yields the same effects similar to those in the first embodiment, and by using the rechargeable battery cell unit 12 and the stabilized power supply unit 500 as the power supply circuits, the first capacitor C_V can be charged more stably. Since the period of charging by the stabilized power supply unit 500 is shorter than the period of charge pump operation by the second capacitor C_F, the power consumed by the stabilized power supply unit 500 exerts only a minor impact on overall power consumption of the rechargeable battery module 50.

In this embodiment, adoption of the stabilized power supply unit 500 to the rechargeable battery module 10 according to the first embodiment has been explained, but the stabilized power supply unit 500 may also be adopted to the rechargeable battery module 20 according to the second embodiment or the rechargeable battery module 30 according to the third embodiment.

Sixth Embodiment

Figure 21:
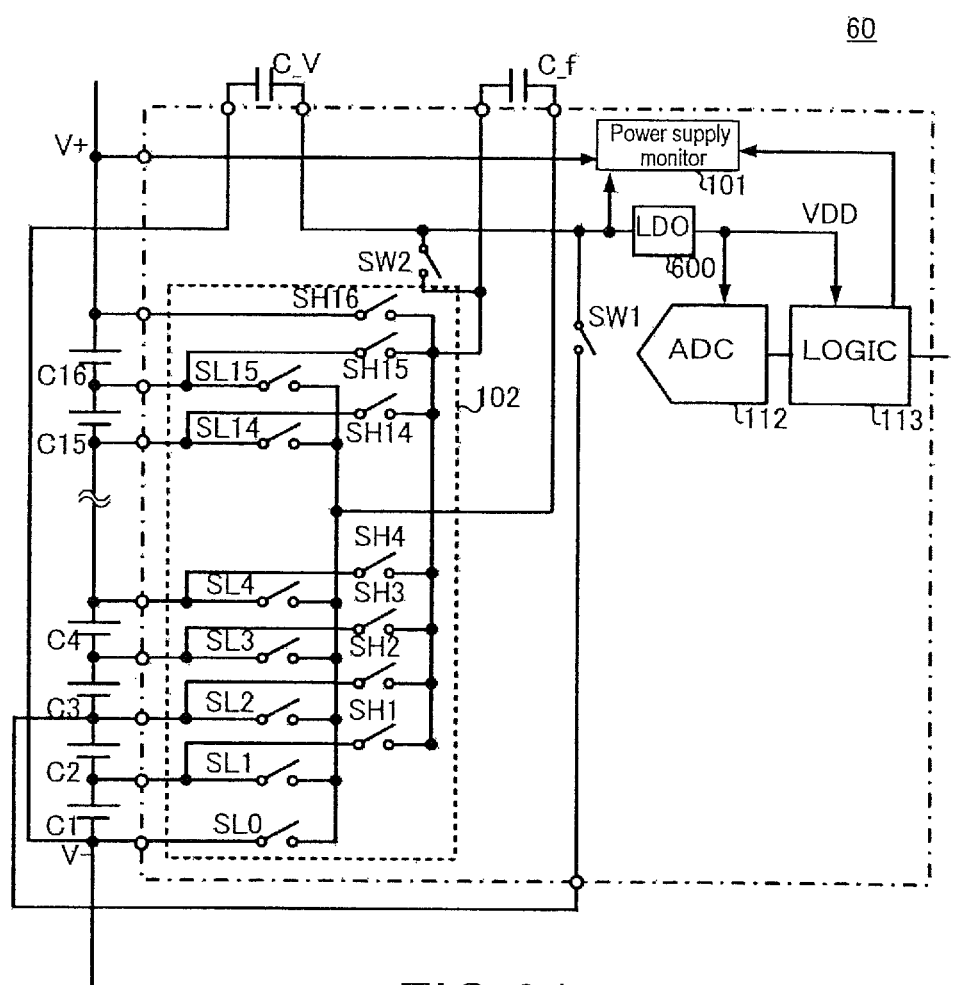
FIG. 21 shows a rechargeable battery module according to a sixth embodiment of the present disclosure.

A rechargeable battery module 60 according to a sixth embodiment will be explained with reference to FIG. 21. The rechargeable battery module 60 according to this embodiment has a low drop out (LDO) circuit 600. Other than this, the rechargeable battery module 60 in the sixth embodiment has the same configuration as that of the rechargeable battery module 10 in the first embodiment, and the rechargeable battery module 60 is installed to the charging apparatus 1.

The LDO circuit 600—a linear regulator with a low drop out voltage—is a circuit capable of outputting a predetermined voltage even if a difference between a voltage input to the LDO circuit 600 and a voltage output by the LDO circuit 600 is small. This LDO circuit 600 is capable of supplying a predetermined output voltage to a low-voltage circuit even when the power supply voltage VDD of the first capacitor C_V is lowered.

As thus explained, the rechargeable battery module 60 according to the sixth embodiment yields the same effects similar to those in the first embodiment. Due to the provision of the LDO circuit 600 between the first capacitor C_V and the low-voltage circuit, a stable power supply voltage VDD can be supplied to the low-voltage circuit.

In this embodiment, adoption of the LDO circuit 600 to the rechargeable battery module 10 according to the first embodiment has been explained, but the LDO circuit 600 may be adopted for the rechargeable battery modules 20 to 50 according to the second to fifth embodiments.

It should be noted that the above-mentioned embodiments are merely examples and the present disclosure is not limited to these embodiments. Hence, modifications can be made depending on the designs and the like without departing from the technical concept of the present disclosure.

The present disclosure contains subject matter related to that disclosed in Japanese Priority Patent Application JP 2011-125801 filed in the Japan Patent Office on Jun. 3, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A power supply apparatus, configured to supply a power supply voltage to a charge monitor configured to monitor a charge state of each of a plurality of rechargeable battery cells, the power supply apparatus comprising:
   a first capacitative element configured to supply the power supply voltage to the charge monitor;
   a second capacitative element configured to be charged from at least one of the plurality of rechargeable battery cells and charge the first capacitative element;
   a switch group including:
      a first switch configured to connect the at least one of the plurality of rechargeable battery cells and the second capacitative element to each other; and
      a second switch configured to connect the first capacitative element and the second capacitative element to each other; and
   a controller configured to:
      control charging of the second capacitative element by the at least one of the plurality of rechargeable battery cells by connecting the at least one of the plurality of rechargeable cells and the second capacitative element to each other by the first switch, and
      control charging of the first capacitative element by the second capacitative element by connecting the second capacitative element and the first capacitative element to each other by the second switch.

2. The power supply apparatus according to claim 1, wherein the plurality of rechargeable battery cells configured to charge the second capacitative element includes a first rechargeable battery cell having a highest voltage among the plurality of rechargeable battery cells.

3. The power supply apparatus according to claim 1, wherein the plurality of rechargeable battery cells configured to charge the second capacitative element includes two or more rechargeable battery cells including:
   a first rechargeable battery cell having a highest voltage among the plurality of rechargeable battery cells, and
   a second rechargeable battery cell connected in series to the first rechargeable battery cell.

4. The power supply apparatus according to claim 1, wherein
   the switch group has a switch configured to connect a power supply circuit, the first capacitative element, and the second capacitative element to one another, and
   the controller controls the switch group so that the power supply circuit, the first capacitative element, and the second capacitative element are connected in parallel in an activation period until the charge monitor starts monitoring a state of each of the plurality of rechargeable battery cells, and repeats the control of charging the first capacitative element and the second capacitative element after the first capacitative element is charged to a predetermined voltage.

5. The power supply apparatus according to claim 4, wherein
the controller controls the switch group so that the first capacitative element and the power supply circuit are connected to each other when a voltage of first capacitative element drops to less than a first value, and
the controller repeats the control of charging the first capacitative element and the second capacitative element when the voltage of the first capacitative element exceeds a second value while the first capacitative element and the power supply circuit are connected to each other.

6. The power supply apparatus according to claim 4, wherein the power supply circuit includes two or more predetermined battery cells connected in series among the plurality of rechargeable battery cells.

7. The power supply apparatus according to claim 4, wherein
the power supply circuit includes the plurality of rechargeable battery cells and a step-down circuit configured to step down a voltage of the power supply circuit, and
the controller controls the switch group so that the first capacitative element and the power supply circuit are connected to each other via the step-down circuit.

8. The power supply apparatus according to claim 1, wherein
the controller controls the switch group so that both ends of the second capacitative element are opened when a voltage of the first capacitative element exceeds a third value, and
the controller repeats the control of charging the first capacitative element and the second capacitative element when the voltage of the first capacitative element drops to less than a fourth value while the both ends of the second capacitative element are opened.

9. The power supply apparatus according to claim 1, wherein
the controller controls the switch group so that the second capacitative element and a rechargeable battery cell having a lowest voltage among the plurality of rechargeable battery cells are connected to each other when a voltage of the first capacitative element exceeds a third value, and
the controller repeats the control of charging the first capacitative element and the second capacitative element when the voltage of the first capacitative element exceeds a fourth value while the second capacitative element and the rechargeable battery cell having the lowest voltage among the plurality of rechargeable battery cells are connected to each other.

10. A method comprising:
in a power supply apparatus comprising a first capacitative element configured to supply a power supply voltage to a charge monitor:
charging a second capacitative element from at least one of the plurality of rechargeable battery cells by connecting the at least one of the plurality of rechargeable battery cells and the second capacitative element to each other; and
charging the first capacitative element from the second capacitative element by connecting the second capacitative element and the first capacitative element to each other.

11. A rechargeable battery cell unit, comprising:
a plurality of rechargeable battery cells;
a charge monitor configured to monitor a charge state of each of the plurality of rechargeable battery cells; and
a power supply apparatus configured to supply a power supply voltage to the charge monitor, the power supply apparatus including:
a first capacitative element configured to supply the power supply voltage to the charge monitor;
a second capacitative element configured to be charged from at least one of the plurality of rechargeable battery cells and charge the first capacitative element;
a switch group including:
a first switch configured to connect the at least one of the plurality of rechargeable battery cells and the second capacitative element to each other; and
a second switch configured to connect the first capacitative element and the second capacitative element to each other; and
a controller configured to:
control charging of the second capacitative element by the at least one of the plurality of rechargeable battery cells by connecting the at least one of the plurality of rechargeable cells and the second capacitative element to each other by the first switch, and
control charging of the first capacitative element by the second capacitative element by connecting the second capacitative element and the first capacitative element to each other by the second switch.

12. A charging apparatus, comprising:
a plurality of rechargeable battery cells;
a charge monitor configured to monitor a charge state of each of the plurality of rechargeable battery cells; and
a power supply apparatus configured to supply a power supply voltage to the charge monitor, the power supply apparatus including:
a first capacitative element configured to supply the power supply voltage to the charge monitor,
a second capacitative element configured to be charged from at least one of the plurality of rechargeable battery cells and charge the first capacitative element;
a switch group including:
a first switch configured to connect the at least one of the plurality of rechargeable battery cells and the second capacitative element to each other; and
a second switch configured to connect the first capacitative element and the second capacitative element to each other, and
a controller configured to:
control charging of the second capacitative element by the at least one of the plurality of rechargeable battery cells by connecting the at least one of the plurality of rechargeable cells and the second capacitative element to each other by the first switch, and
control charging of the first capacitative element by the second capacitative element by connecting the second capacitative element and the first capacitative element to each other by the second switch.

* * * * *